US 8,855,719 B2

(12) United States Patent
Jacobsen et al.

(10) Patent No.: US 8,855,719 B2
(45) Date of Patent: Oct. 7, 2014

(54) WIRELESS HANDS-FREE COMPUTING HEADSET WITH DETACHABLE ACCESSORIES CONTROLLABLE BY MOTION, BODY GESTURE AND/OR VOCAL COMMANDS

(75) Inventors: Jeffrey J. Jacobsen, Hollister, CA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 0 days.

(21) Appl. No.: 13/018,999

(22) Filed: Feb. 1, 2011

(65) Prior Publication Data
US 2011/0187640 A1    Aug. 4, 2011

Related U.S. Application Data

(60) Provisional application No. 61/300,611, filed on Feb. 2, 2010.

(51) Int. Cl.
*H04B 1/38* (2006.01)
*G06F 3/038* (2013.01)
*G06F 3/0346* (2013.01)
*G06F 3/01* (2006.01)
*G02B 27/01* (2006.01)

(52) U.S. Cl.
CPC ........ *G06F 3/038* (2013.01); *G02B 2027/0138* (2013.01); *G02B 2027/014* (2013.01); *G06F 3/0346* (2013.01); *G06F 3/012* (2013.01); *G02B 2027/0187* (2013.01); *G02B 27/017* (2013.01); *G06F 2203/0381* (2013.01)
USPC ......................................................... 455/566

(58) Field of Classification Search
USPC ........................................ 455/566; 345/8, 156
See application file for complete search history.

(56) References Cited

U.S. PATENT DOCUMENTS

| 5,990,793 A | 11/1999 | Bieback |
| 6,010,216 A | 1/2000 | Jesiek |

(Continued)

FOREIGN PATENT DOCUMENTS

| WO | WO 95/21408 | 8/1995 |
| WO | WO 95/23994 | 9/1995 |

(Continued)

OTHER PUBLICATIONS

Notification of Transmittal of the International Search Report and the Written Opinion, including International Search Report and Written Opinion; International Application No. PCT/US2011/023337, Date of Mailing Mar. 28, 2011, including Search History.

(Continued)

*Primary Examiner* — David Bilodeau
(74) *Attorney, Agent, or Firm* — Hamilton, Brook, Smith & Reynolds, P.C.

(57) ABSTRACT

A remote control microdisplay device that uses hand movement, body gesture, head movement, head position and/or vocal commands to control the headset, a peripheral device, a remote system, network or software application, such as to control the parameters of a field of view for the microdisplay within a larger virtual display area associated with a host application, a peripheral device or host system. The movement and/or vocal commands are detected via the headset and/or detachable peripheral device connected to the headset microdisplay device via one or more peripheral ports.

19 Claims, 23 Drawing Sheets

(56) References Cited

U.S. PATENT DOCUMENTS

| | | | |
|---|---|---|---|
| 6,084,556 A | 7/2000 | Zwern | |
| 6,108,197 A | 8/2000 | Janik | |
| 6,204,974 B1 | 3/2001 | Spitzer | |
| 6,325,507 B1 | 12/2001 | Jannard et al. | |
| 6,798,391 B2 | 9/2004 | Peterson, III | |
| 6,853,293 B2 | 2/2005 | Swartz et al. | |
| 6,900,777 B1 | 5/2005 | Hebert et al. | |
| 6,922,184 B2 | 7/2005 | Lawrence et al. | |
| 6,956,614 B1 | 10/2005 | Quintana et al. | |
| 6,966,647 B2 | 11/2005 | Jannard et al. | |
| 7,004,582 B2 | 2/2006 | Jannard et al. | |
| 7,013,009 B2 | 3/2006 | Warren | |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Grand et al. | |
| 7,278,734 B2 | 10/2007 | Jannard et al. | |
| 7,331,666 B2 | 2/2008 | Swab et al. | |
| 7,445,332 B2 | 11/2008 | Jannard et al. | |
| 7,452,073 B2 | 11/2008 | Jannard et al. | |
| 7,458,682 B1 | 12/2008 | Lee | |
| 7,461,936 B2 | 12/2008 | Jannard | |
| 7,494,216 B2 | 2/2009 | Jannard et al. | |
| 7,501,995 B2 | 3/2009 | Morita et al. | |
| 7,512,414 B2 | 3/2009 | Jannard et al. | |
| 7,620,432 B2 | 11/2009 | Willins et al. | |
| 7,682,018 B2 | 3/2010 | Jannard | |
| 7,740,353 B2 | 6/2010 | Jannard | |
| 7,744,213 B2 | 6/2010 | Jannard et al. | |
| 7,753,520 B2 | 7/2010 | Fuziak, Jr. | |
| 7,760,898 B2 | 7/2010 | Howell et al. | |
| 7,798,638 B2 | 9/2010 | Fuziak, Jr. | |
| 7,806,525 B2 | 10/2010 | Howell et al. | |
| 8,184,983 B1* | 5/2012 | Ho et al. | 398/130 |
| 2002/0015008 A1 | 2/2002 | Kishida et al. | |
| 2002/0030649 A1* | 3/2002 | Zavracky et al. | 345/87 |
| 2002/0044152 A1 | 4/2002 | Abbott, III et al. | |
| 2002/0094845 A1 | 7/2002 | Inasaka | |
| 2003/0068057 A1 | 4/2003 | Miller et al. | |
| 2004/0113867 A1 | 6/2004 | Tomine et al. | |
| 2004/0193413 A1 | 9/2004 | Wilson et al. | |
| 2005/0237296 A1 | 10/2005 | Lee | |
| 2005/0264527 A1 | 12/2005 | Lin | |
| 2006/0028400 A1* | 2/2006 | Lapstun et al. | 345/8 |
| 2006/0061551 A1 | 3/2006 | Fateh | |
| 2006/0109237 A1 | 5/2006 | Morita et al. | |
| 2006/0132382 A1 | 6/2006 | Jannard | |
| 2006/0221266 A1* | 10/2006 | Kato et al. | 348/838 |
| 2007/0009125 A1* | 1/2007 | Frerking et al. | 381/315 |
| 2007/0103388 A1* | 5/2007 | Spitzer | 345/8 |
| 2007/0180979 A1* | 8/2007 | Rosenberg | 84/611 |
| 2007/0265495 A1 | 11/2007 | Vayser | |
| 2008/0055194 A1* | 3/2008 | Baudino et al. | 345/8 |
| 2008/0084992 A1 | 4/2008 | Peddireddy et al. | |
| 2008/0144854 A1* | 6/2008 | Abreu | 381/74 |
| 2008/0198324 A1 | 8/2008 | Fuziak | |
| 2008/0200774 A1 | 8/2008 | Luo | |
| 2009/0099836 A1* | 4/2009 | Jacobsen et al. | 704/3 |
| 2009/0117890 A1* | 5/2009 | Jacobsen et al. | 455/419 |
| 2009/0128448 A1 | 5/2009 | Riechel | |
| 2009/0154719 A1 | 6/2009 | Wulff et al. | |
| 2009/0180195 A1 | 7/2009 | Cakmakci et al. | |
| 2009/0182562 A1 | 7/2009 | Claire et al. | |
| 2009/0251409 A1* | 10/2009 | Parkinson et al. | 345/156 |
| 2010/0020229 A1 | 1/2010 | Hershey et al. | |
| 2010/0033830 A1 | 2/2010 | Yung | |
| 2010/0053069 A1 | 3/2010 | Tricoukes et al. | |
| 2010/0121480 A1 | 5/2010 | Stelzer et al. | |
| 2010/0128626 A1* | 5/2010 | Anderson et al. | 370/252 |
| 2010/0141554 A1* | 6/2010 | Devereaux et al. | 345/7 |
| 2010/0164990 A1 | 7/2010 | Van Doorn | |
| 2010/0171680 A1 | 7/2010 | Lapidot et al. | |
| 2010/0238184 A1 | 9/2010 | Janicki | |
| 2010/0245585 A1 | 9/2010 | Fisher et al. | |
| 2010/0271587 A1 | 10/2010 | Pavlopoulos | |
| 2010/0277563 A1 | 11/2010 | Gupta et al. | |
| 2010/0289817 A1 | 11/2010 | Meier et al. | |
| 2010/0302137 A1 | 12/2010 | Benko et al. | |
| 2010/0309295 A1 | 12/2010 | Chow | |
| 2011/0001699 A1* | 1/2011 | Jacobsen et al. | 345/157 |
| 2011/0092825 A1 | 4/2011 | Gopinathan et al. | |
| 2011/0187640 A1 | 8/2011 | Jacobsen et al. | |
| 2012/0013843 A1 | 1/2012 | Jannard | |
| 2012/0068914 A1* | 3/2012 | Jacobsen et al. | 345/8 |
| 2012/0075177 A1* | 3/2012 | Jacobsen et al. | 345/156 |
| 2012/0110456 A1 | 5/2012 | Larco et al. | |
| 2012/0236025 A1 | 9/2012 | Jacobsen et al. | |
| 2012/0287284 A1 | 11/2012 | Jacobsen et al. | |
| 2013/0174205 A1 | 7/2013 | Jacobsen et al. | |
| 2013/0289971 A1 | 10/2013 | Parkinson | |

FOREIGN PATENT DOCUMENTS

| | | |
|---|---|---|
| WO | WO 2009/076016 | 6/2009 |
| WO | WO 2009/120984 A1 | 10/2009 |
| WO | WO 2011/051660 | 5/2011 |
| WO | WO 2011/097226 | 8/2011 |
| WO | WO 2011/114149 A1 | 9/2011 |
| WO | WO 2012/040386 | 3/2012 |

OTHER PUBLICATIONS

Notification of Transmittal of International Search Report and Written Opinion of PCT/US2012/037284 dated Oct. 1, 2012.

Notification Concerning Transmittal of International Preliminary Report on Patentability for Application No. PCT/US2011/023337, dated Aug. 16, 2012, consisting of 8 pages.

Notification of Transmittal of International Search Report and Written Opinion of PCT/US2012/068686, Date of Mailing: Mar. 25, 2013, 11 pages.

\* cited by examiner

FIG. 5

WIRELESS HANDS-FREE COMPUTING HEADSET WITH DETACHABLE ACCESSORIES CONTROLLABLE BY MOTION, BODY GESTURE AND/OR VOCAL COMMANDS

RELATED APPLICATION(S)

This application claims the benefit of U.S. Provisional Application No. 61/300,611 filed on Feb. 2, 2010, and claims priority to U.S. application Ser. No. 12/774,179 filed on May, 5, 2010 entitled "Remote Control of Host Application Using Motion and Voice Commands", which claims the benefit of U.S. Provisional Application No. 61/176,662, filed on May 8, 2009 entitled "Remote Control of Host Application Using Tracking and Voice Commands" and U.S. Provisional Application No. 61/237,884, filed on Aug. 28, 2009 entitled "Remote Control of Host Application Using Motion and Voice Commands". The entire teachings of the above applications are incorporated herein by reference.

TECHNICAL FIELD

The present disclosure relates to the use of a wireless computing headset or other eyewear having integrated mounts for accommodating peripherals. More specifically, the accommodated peripherals accept multiple interface inputs such as geo-positional, 3 axis to 9 axis degrees of freedom orientational sensing, atmospheric sensors, health condition sensors, GPS, Digital compass (multi-axis magnetometer), pressure sensors, energy sensors, optical sensors, etc.), peripheral attitude (pitch, roll, yaw and point of origin), hand motion, head motion, user gesture and/or vocal commands to control peripheral operation or a software application program.

BACKGROUND

The present application relates to human/computer interfaces and more particularly to a wireless computing headset with one or more microdisplay devices that can provide hands-free remote control of attached or remote peripheral devices, systems and/or networks. The wireless computing headsets, as well as attached or remote peripheral devices, systems and/or networks are enabled to receive one or multiple inputs such as geo-positional, 3 axis to 9 axis degrees of freedom orientational sensing, atmospheric sensors, health condition sensors, GPS, Digital compass (multi-axis magnetometer), pressure sensors, environmental sensors, energy sensors, optical sensors, etc.), hand motion, head motion, user gesture and/or vocal commands to control headset operation, peripheral device operation or a software application program executing on the headset, the peripheral device, system or network.

Small, portable electronic devices capable of storing and displaying large amounts of high resolution computer graphic information and even video content continue to be increasingly popular. These devices, such as the Apple iPhone™, represent a significant trend towards convergence among mobile phones, portable computers and digital media players. (iPhone is a trademark of Apple Computer, Inc. of Cupertino, Calif.) While these devices typically include a display screen, the visual experience of a high resolution, large format display cannot be easily replicated in such devices because of their physical size limitations.

As a result, professionals and consumers are now seeking a high quality, portable, color display solution to augment their handheld and desktop devices. Recently developed microdisplays can provide large format, high resolution color pictures and streaming video in a very small form factor. One application for such displays is a wireless computing headset worn near the user's face or head similar to a familiar audio headset or eyewear. A "wireless computing headset" device includes one or more small high resolution micro-displays and optics to magnify the image. The micro-displays can provide Super Video Graphics Array (SVGA) (800×600) resolution or Extended Graphics Array (XGA) (1024×768) or even higher resolutions. A "wireless computing headset contains one or more wireless computing interfaces, enabling data and streaming video capability, providing great convenience and mobility to such devices. For more information concerning such devices, see co-pending patent applications entitled "Mobile Wireless Display Software Platform for Controlling Other Systems and Devices", U.S. application Ser. No. 12/348,648 filed Jan. 5, 2009 and "Handheld Wireless Display Devices Having High Resolution Display Suitable for Use as Mobile Internet Device", PCT International Application No. PCT/US09/38601 filed Mar. 27, 2009, each of which are incorporated herein by reference in their entirety.

SUMMARY OF THE INVENTIONS

A wireless computing headset remote control microdisplay device uses input devices such as a head tracking accelerometer(s), gyro(s) and/or magnitometers, GPS, digital compass, and/or a camera(s) to detect headset position, peripheral position, motion, direction, elevation, velocity, movements such as head movements, hand motions and/or body gestures, with optional vocal commands, to provide control inputs to the headset, peripheral device and/or a software application program running on the headset, the peripheral device, a remote system or network. In one example, the inputs may be used to set the parameters of a field of view for the microdisplay such as a field of view within a larger virtual display area associated with stored data on the headset, stored data on the peripheral device, data or a video stream received by the headset or peripheral or a software application running on the headset, peripheral device, remote system and/or network. The display or displays may be embodied in various forms, as a monocular display in a wireless computing headset, a binocular wireless computing headset, a head mounted display (HMD) or other eyewear device.

In a preferred embodiment, the wireless computing headset apparatus includes one or more auxiliary interface mounts to allow electrical, wireless and/or mechanical connection of peripheral devices such as, but not limited to, speakers, displays, geo-positional, 3 axis to 9 axis degrees of freedom orientational sensing, atmospheric sensors, health condition sensors, GPS, Digital compass, pressure sensors, environmental sensors, energy sensors, cameras (visible, infrared, etc.), additional wireless radios, auxiliary lighting, range finders, or the like, which can be controlled by or enhance headset or peripheral device control by sensor(s) input, position, hand motion, body gesture, head movement and/or vocal inputs. The mount(s) may preferably provide power to the peripherals. The mount(s) also can be wirelessly or electrically connected to provide sensor data detected by the peripherals to a processor located in the peripheral, the headset and/or to a remote host system processor via wired or wireless connections. The processor interprets the headset or peripheral position, movement, various sensors, hand motion, body gesture, head movement and/or vocal signals to provide a command(s) to headset, peripheral, remote system and/or an software application program.

The present invention can provide a headset portable device including one or more displays, for displaying visual information received from a local processor. One or more peripheral ports can support one or more peripheral devices that provide one or more peripheral input signals indicating a sensor input or at least of one of a user motion and/or vocal input. A local processor can be located in the headset portable device and further include one or more receivers for receiving the peripheral inputs. A translator can translate sensor information, user information and/or vocal input from one or more peripheral ports into one or more user commands. A communication interface can forward the user command to a host processor, and receive a reply from the host processor. A display controller can forward information to be displayed on the one or more microdisplays in response to the reply, including at least an audible and/or visual confirmation of the local processor having processed the user commands.

In particular embodiments, the one or more peripheral devices can include one or more microphones for receiving audio signals from the user. The local processor can further include a speech recognizer for processing the audio signals to produce vocal commands. The translator can further use the vocal commands to determine the host commands. The one or more peripheral devices can be a motion detector and the motion detector can provide two or more motion inputs indicative of motion along two or more axes. The motion detector also can be a camera for detecting hand and/or body gesture movements of the user. The motion detector can also be a head movement tracking device for detecting 3 axis up to 9 axis degrees of freedom head movements of the user. The communication interface can be one or more wireless links between the headset portable device and the host processor. The user commands can be processed by the local processor to control aspect of the presentation of visual information displayed on the microdisplay. The user commands can control a field of view. The user commands can control a zoom, pan, or scaled factors. The user command can select a hyperlink item in a web page display. The one or more peripheral ports can be a wireless interface to two or more remote cameras or other one or more peripheral devices. The user commands can be forwarded as a host command to the host processor. The reply can result in a cursor movement.

The present invention can also provide a method for operating a headset portable device having a microdisplay, one or more peripheral ports, one or more wireless communication interfaces, and a local processor, including displaying visual information received from the local processor on a microdisplay. One or more peripheral ports can be used for supporting one or more sensors, or peripheral devices for detecting sensor and user input from a user. Sensor and/or user input can be translated into user commands. At least one aspect of the headset, peripheral devices, remote host systems or visual information presented on the microdisplay can be controlled based on the user commands.

In particular embodiments, the aspect of the visual information can be a field of view. The aspect of the visual information also can be a zoom, pan, scale factor and/or 3D effect. User commands to a host processor can be forwarded using the wireless interface. The user input can be two or more motion inputs indicative of motion of the user in two or more axes. The user input can be a camera for detecting hand movement or body gesture of the user. The user input can be derived from head movement and positioning sensors for detecting and tracking as little as 3 axis degrees of freedom or up to 9 axis degrees of freedom.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5 illustrates a web browsing example using vocal and head movement commands.

DETAILED DESCRIPTION OF PREFERRED EMBODIMENTS

Figure 1A:
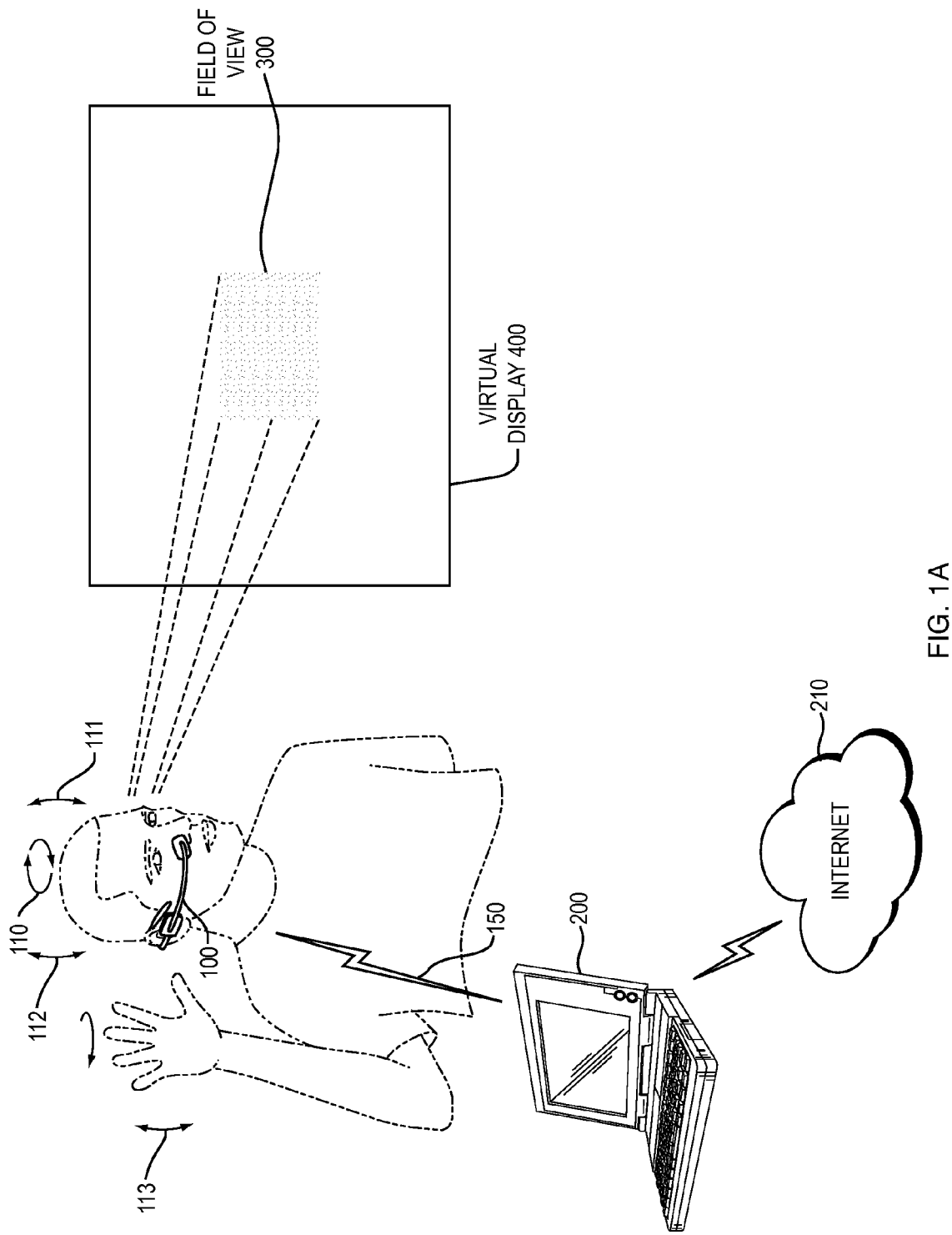
FIG. 1A is a high level diagram showing a wireless computing headset device, and a person using hand gestures and/or head movements to control a host computer, a virtual display and/or field of view.

FIG. 1A shows a remote control wireless computing headset device 100 (also referred to herein as a video eyewear device 100) that incorporates a high resolution (VGA or better) microdisplay element 140 and other features described below. Audio input and/or output devices, including one or more microphone(s) input and output speaker(s), geo-positional sensing, 3 axis to 9 axis degrees of freedom orientational sensing, atmospheric sensors, health condition sensors, GPS, Digital compass, pressure sensors, environmental sensors, energy sensors, acceleration, position, attitude, motion, velocity or optical sensors, cameras (visible, infrared, etc.), additional wireless radios, auxiliary lighting, range finders, or the like, and/or an array of sensors embedded in the headset and/or attached to the device via one or more peripheral ports (not shown in detail in FIG. 1). Also typically located within the housing are various electronic circuits including, as will be understood shortly, a microcomputer (single or multi-core), one or more wired and wireless interface(s), associated memory or storage devices, various sensors and a peripheral mount or mounts such as a "hot shoe".

The device 100 can be used in various ways. It can be used as a remote display for a streaming video signal provided by a remote host computing device 200. The host 200 may be, for example, a laptop, cell phone, Blackberry, iPhone™, or other computing device having less or greater computational complexity than the wireless computing headset remote control device 100. The host 200 may be further connected to other networks such as through a wired or wireless connection 210 to the Internet. The device 100 and host 200 are connected via one or more suitable wireless connections such as provided by a Bluetooth WiFi, cellular, LTE, WiMax or other wireless radio link 150.

The device 100 can also be used as a remote control for the host 200. For example, the device 100 can allow a user to select a field of view 300 within a much larger area defined by a virtual display 400 on host 200. The user can typically control the position, extent (e.g., X-Y or 3D range), and/or magnification of the field of view 300 using head movements or hand movements or body gestures or in other ways, such as with vocal or voice commands. The wireless computing headset device 100 thus can have specialized user input peripherals and processing to, for example, pan and zoom and control the field of view of the display.

Also located within device 100 are circuits including, as will be understood shortly, a microcomputer (single or multi-core), one or more wireless interfaces, associated memory or other storage devices, one or more cameras (optical sensors) and/or various sensors previously mentioned. The camera(s), motion sensor(s) and/or positional sensor(s) are used to track the motion and/or position of the user's head, hands and/or body in at least a first axis 111 (horizontal), but preferably also a second (vertical) 112, a third (depth) 113, a fourth (pitch) 114, a fifth (roll) 115 and a sixth (yaw) 116. A 3 axis magnetometer (digital compass) can be added to provide the wireless computing headset or peripheral device with a full 9 axis degrees of freedom positional accuracy.

As mentioned, the device 100 is used as a remote control for a host computing device 200. The host 200 may be, for example, a laptop, cell phone, Blackberry™, iPhone™, or other computing device having less or greater computational complexity than the remote control device 100. The host 200 may be further connected to other networks such as through a wireless connection 210 to the Internet. The remote control 100 and host 200 are connected via a suitable wireless connection such as provided by a Bluetooth™, WiFi or other short range wireless link 150.

According to aspects that will be explained in more detail below, the remote control device 100 allows a user to select a field of view 300 within a much larger area defined by a virtual display. The user can typically control the position, extent (e.g., X-Y or 3D range), and/or magnification of the field of view 300.

While what is shown in FIG. 1A is a monocular microdisplay presenting a single fixed display element supported on the face of the user with a cantilevered boom, it should be understood that other mechanical configurations for the remote control display device 100 are possible.

Figure 1B:
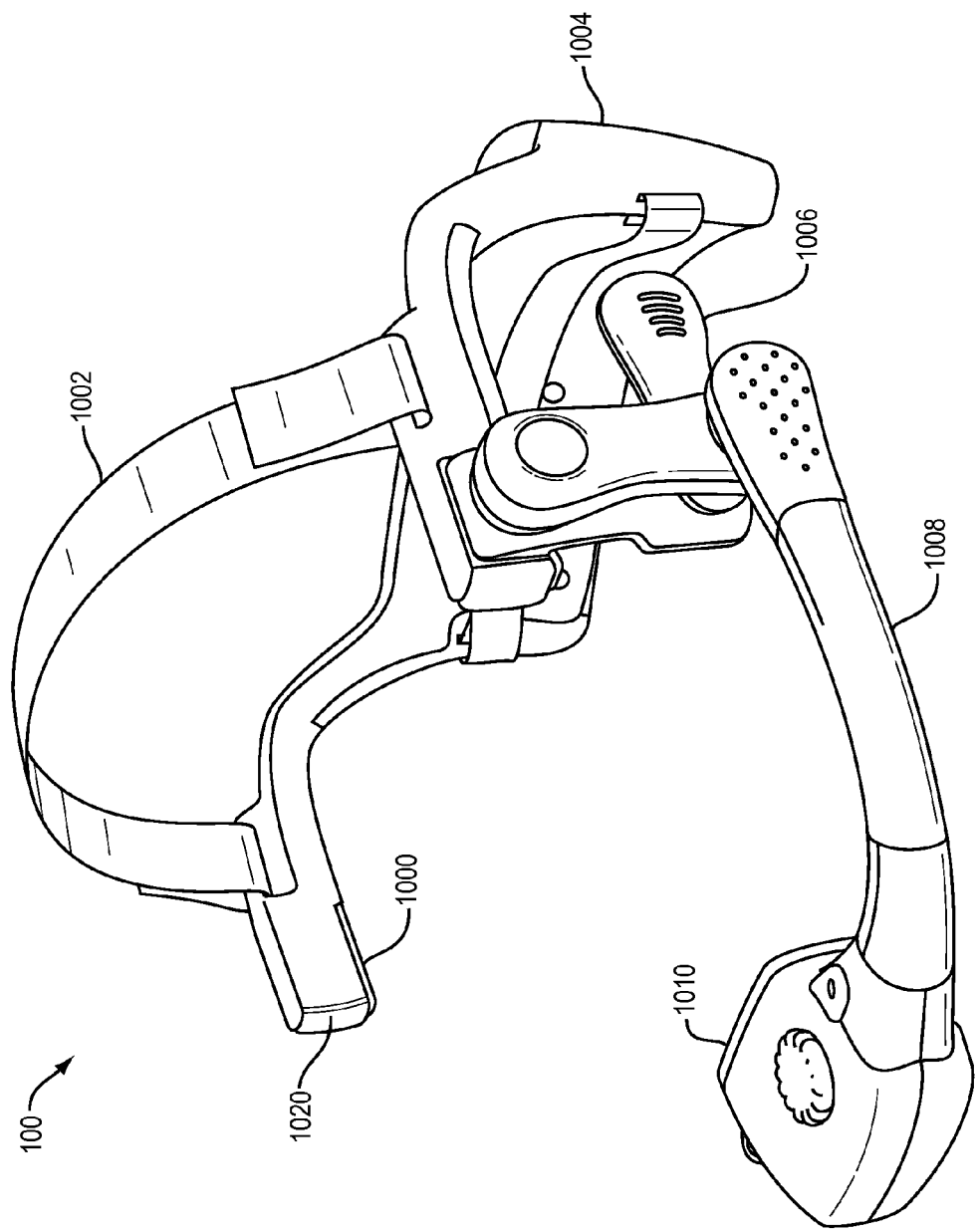
FIG. 1B is a more detailed view of the wireless computing headset and peripheral part.

FIG. 1B is a perspective view showing more detail of the device 100. The device 100 includes generally a frame 1000, a strap 1002, at back section 1004, speaker 1006, cantilever or arm 1008 and microdisplay subassembly 1010.

Of interest to the present disclosure is the detail shown wherein one side of the device 100 opposite the cantilever arm 1008 is a peripheral port 1020. The peripheral port 1020 provides corresponding connections to one or more accessory peripheral devices (as explained in detail below), so a user can removably attach various accessories to the device 100. An example port 1020 provides a mechanical and electrical accessory mount such as a hot shoe. Wiring carries electrical signals from port 1020 through, for example, the back portion 1004 to circuitry disposed therein. Hot shoe 1020 can operate much like the hot shoe on a camera, automatically providing connections to power the accessory and carry signals to and from the rest of device 100 peripheral speaker 1031.

Various types of accessories can be used with port 1020 to provide the hand movements, head movements, and or vocal inputs to the system, such as but not limited to microphones, positional, orientation and other previously described sensors, cameras, speakers, and the like.

Figure 2:
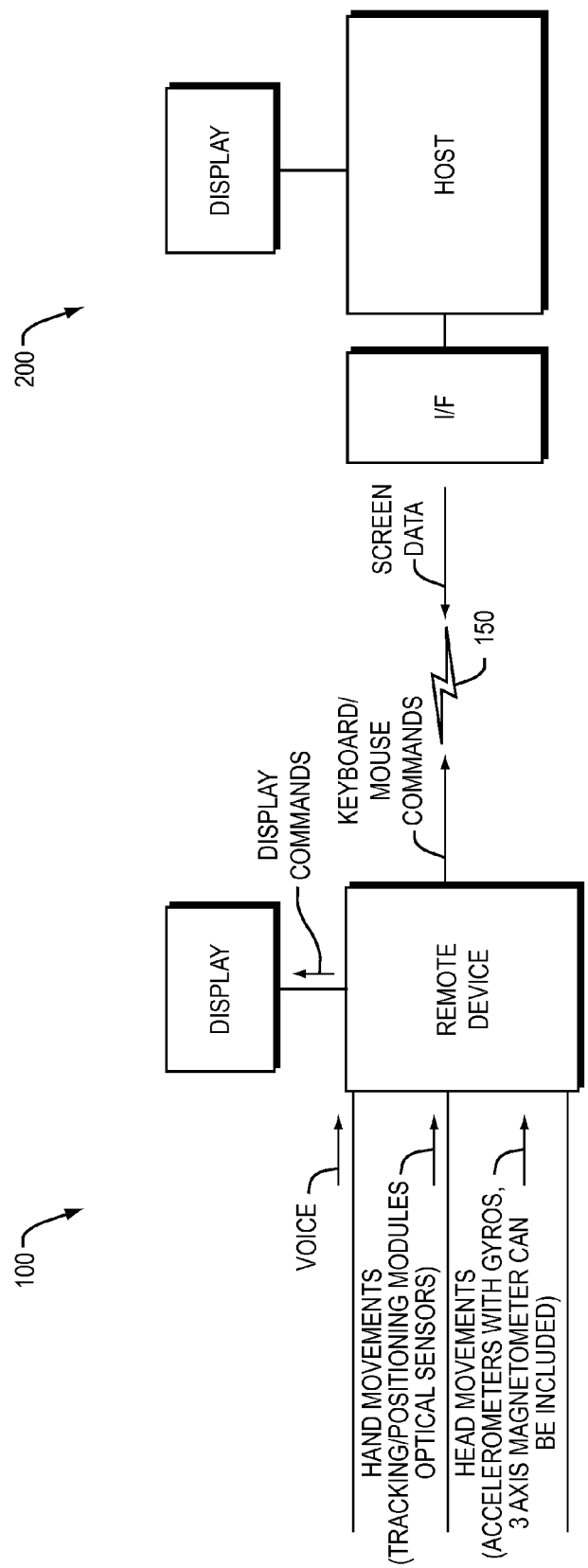
FIG. 2 is a high level block diagram of the remote control device and host illustrating how vocal, hand gesture and head tracking commands are translated to keyboard and mouse commands.

FIG. 2 is a block diagram showing more detail of the remote control display 100, host 200 and the data that travels between them. The remote control display 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software in the remote device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display and return that selected screen data to the remote device. Thus, it should be understood that a very large format virtual display area might be associated with application software or an operating system running on the host 200. However, only a portion of that large virtual display area within the field of view 300 is returned to and actually displayed by the remote control display device 100.

Figure 3A:
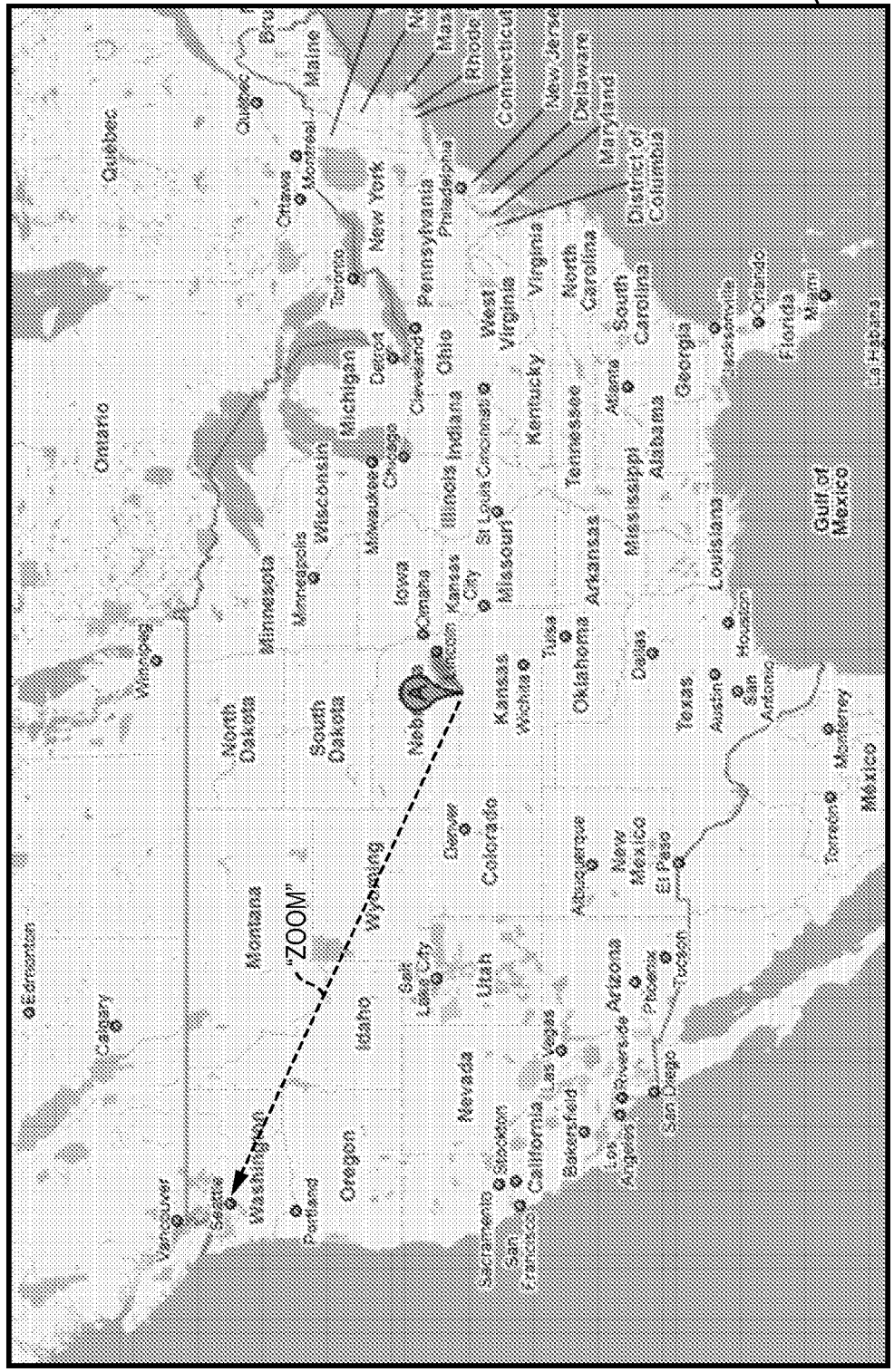
FIGS. 3A and 3B illustrate how a combination of vocal and head tracking commands manipulate the field of view within the virtual display.
Figure 3B:
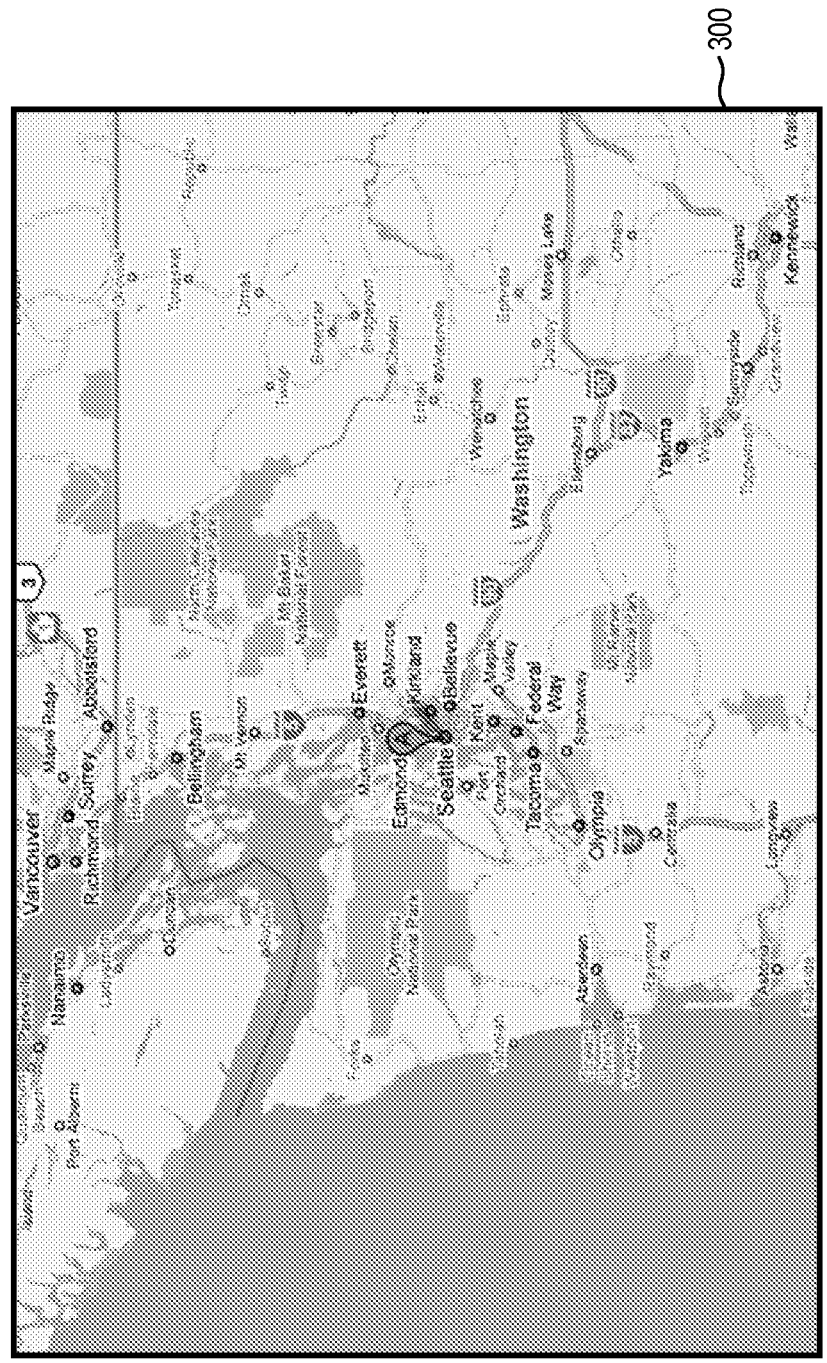

FIGS. 3A and 3B are an example of where the virtual display area on host 200 may include a detailed map of the United States. A user may initially see the entire virtual display area on the microdisplay 140, albeit at reduced resolution. As shown in FIG. 3A, the field of view is thus initially centered at a low magnification on a central cursor point or location, such as on the map at Lawrence, Kans. The user then moves his head or makes a hand gesture to view an area of specific interest in some detail. The hand gesture may be a diagonal sweeping motion. The head movement may be to the left and then up or may be a straight diagonal movement over to an area of interest for the user. For example, the user may now be interested in the area surrounding Seattle, Wash. and has moved his/her head there. With a corresponding vocal command such as "zoom in", the presented virtual display area is then zoomed in to see the area around Seattle in more detail on the microdisplay, as in FIG. 3B. This may optionally be all the while the original entire United States area is still being presented by the host.

It is also possible to switch back and forth between the original entire United States area and the area around Seattle by voice command. Alternatively the switch can be between any two zoom levels or any two different locations in the map.

Figure 4A:
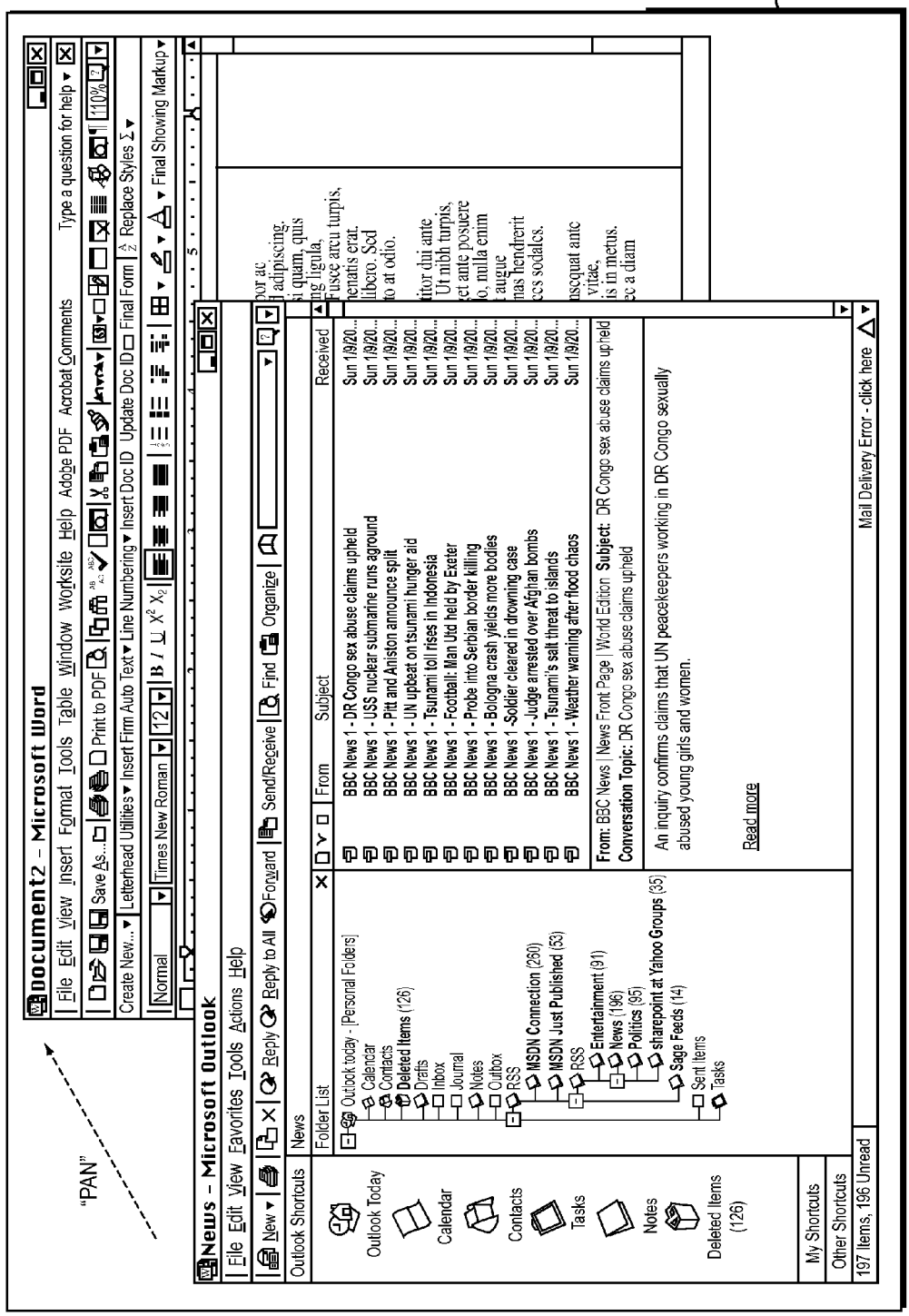
FIGS. 4A and 4B are another example of using vocal and head movement commands.
Figure 4B:
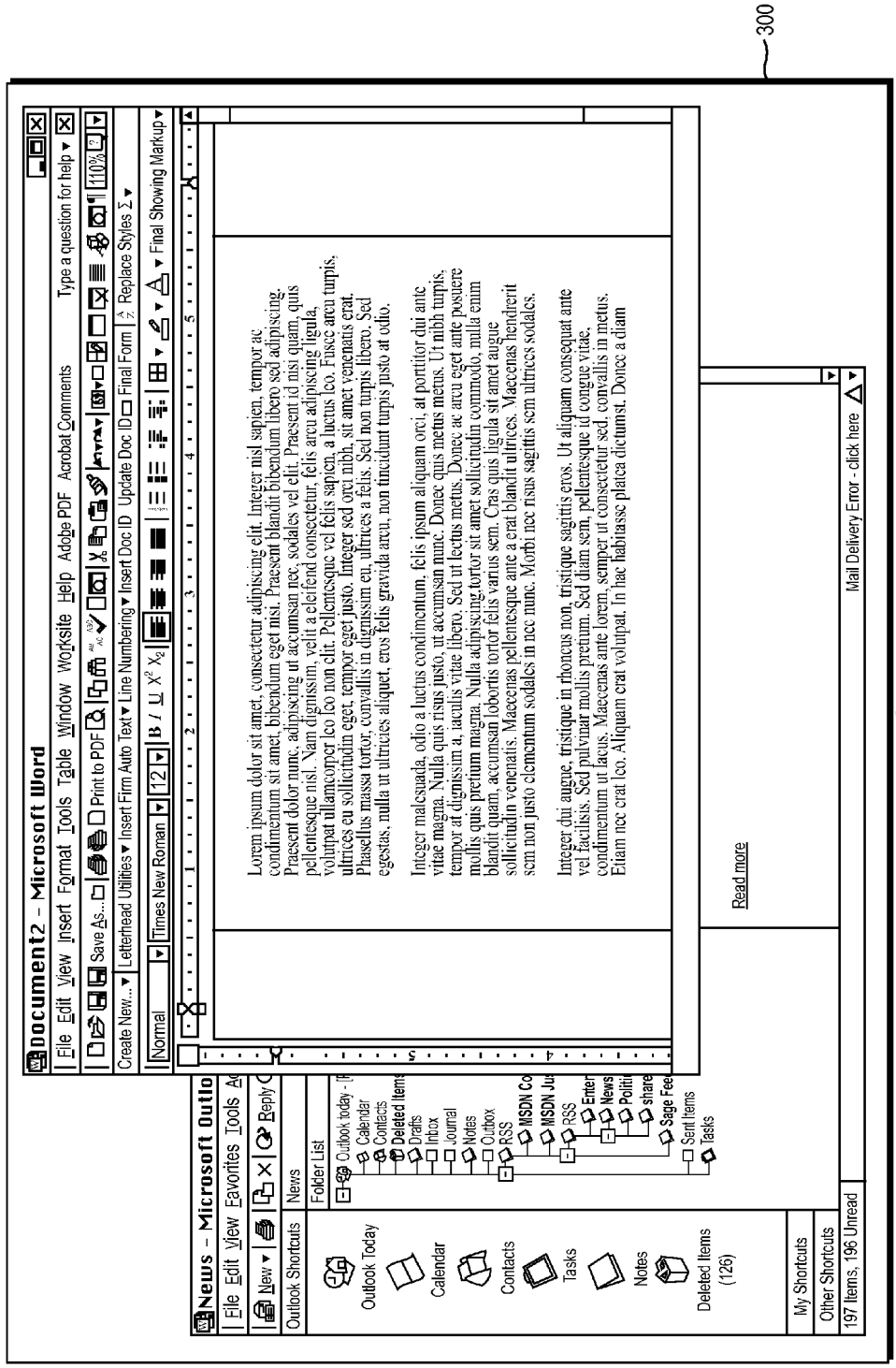

FIGS. 4A and 4B are a more detailed view of how a typical host computer 200 display may be controlled by the remote device 100. A user initially sees a center portion of the screen and may select one of two modes: either (a) move cursor mode or (b) pan/zoom mode. Selecting the first of these modes with a voice command, the user can use hand gestures or head movements to cause the cursor to move around (left, right, up, down) within the virtual display. Thus, as shown in FIG. 4A, for example, with the field of view originally centered on the Microsoft Outlook email window the user in this mode may use a hand or head movement to position the cursor over a particular email message to read. The user may then say a command, such as "SELECT" to cause the email message to appear in the display pane.

However, the user may then issue another vocal command such as "SELECT PAN" causing the screen to pan out, allow the user to better see a different part of the screen such as a portion of the Microsoft Word document window sitting behind the Outlook window. Using the hand or head movements and speaking a "SELECT" vocal command, the user may then change the field of view so that the Microsoft Word document appears in front. See FIG. 4B.

Figure 5:
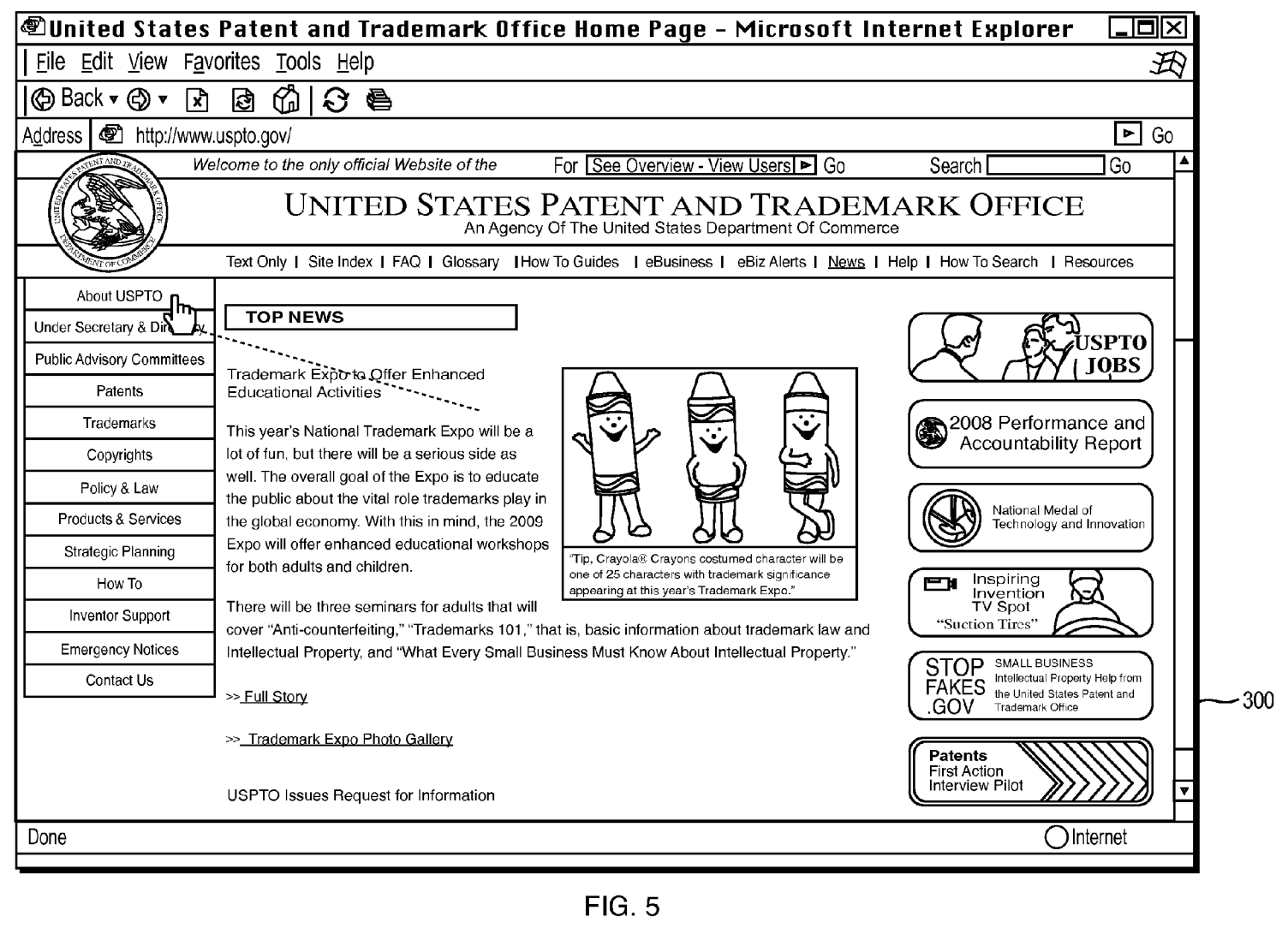

FIG. 5 is a similar example of using hand or head movements and voice commands to navigate web pages using a web browser. Here the user can select the move mode and use hand or head movements to position the cursor at a particular hyperlink of interest. Using the voice command "SELECT", the selected hyperlink e.g., "About USPTO" is then activated. The browser then moves forward to the selected web page.

Thus, using hand or head movements, the user can select from among multiple hyperlinks displayed on a web page, and using a vocal command, then cause that hyperlink to be selected. Other combinations of hand/head movements and vocal commands may cause web pages to be scrolled up and down, page back or forward, or implement other typical web browser commands.

Figure 6A:
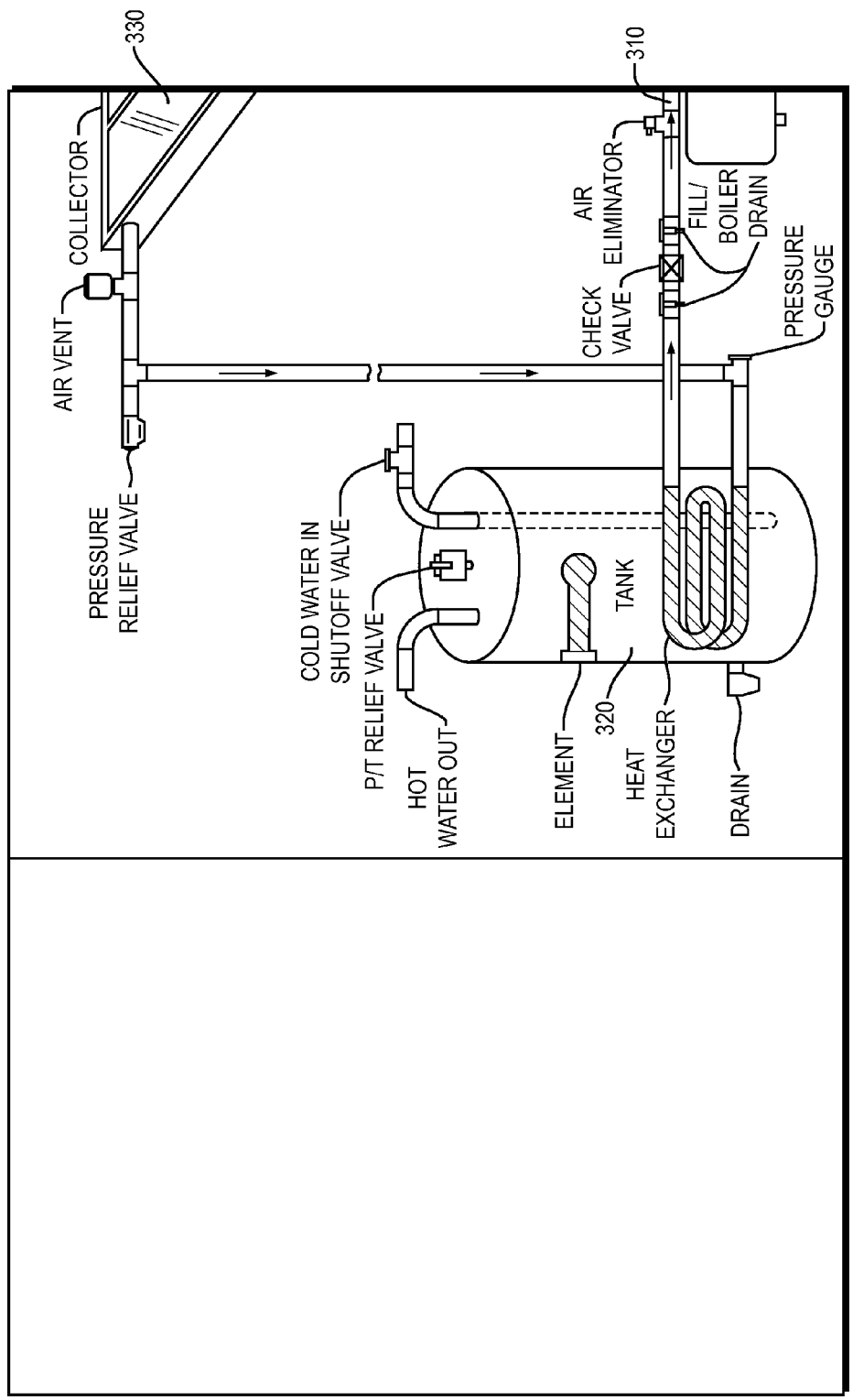
FIGS. 6A and 6B are another example of navigating an architectural drawing.
Figure 6B:
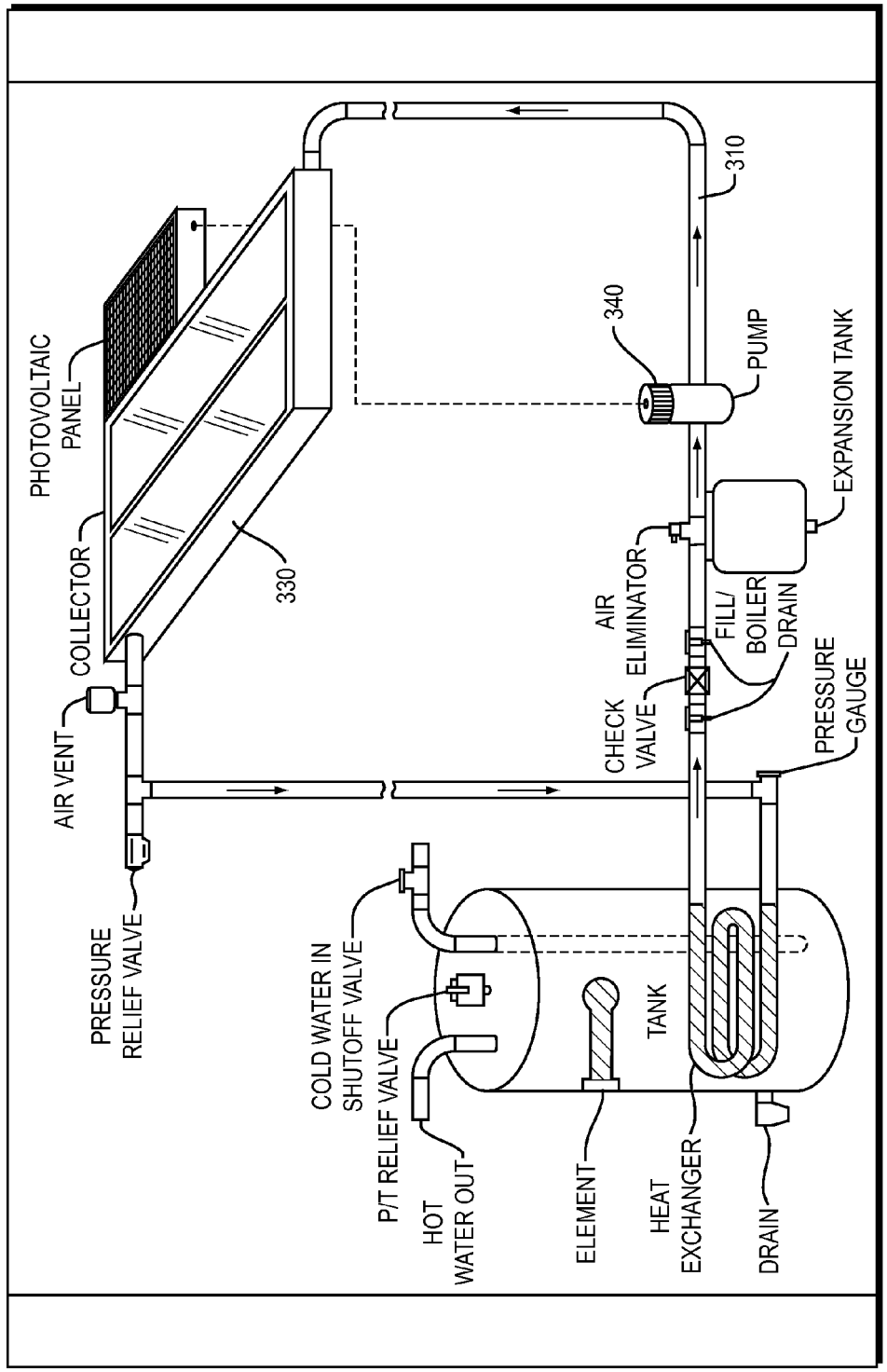

FIGS. 6A and 6B are another example of using the remote control display device to view an architectural drawing. The virtual display area is, in this example, a drawing of a solar water heating system installed in a building. A user has picked a particular pipe 310 of interest while in the mouse move mode. The user can, with hand/head movements, then follow the pipe 310 along its path (e.g. follow the path between the "tank" 320 and the "collector" 330). For example, by simply moving her hand/head to the right, the field of view thus follows the pipe section of interest as user's hand/head moves to bring the pump 340 and collector 330 both within the field of view.

The speed of movement in this mode can be controlled by the range, severity, or relative amount of the user's hand movement. For example, the amount of hand movement that causes a particular corresponding movement of the cursor and/or field of view within the virtual display can be controlled by the user in much the same way as the scale of the mouse movement is controlled within a Microsoft Windows operating system.

Figure 7A:
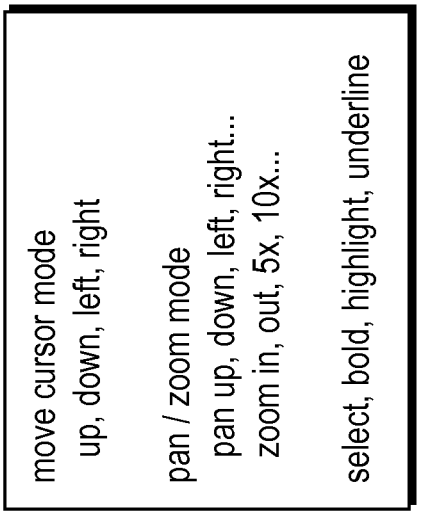
FIG. 7A is a list of typical commands, including screen commands and application specific commands.

FIG. 7A is a list of typical vocal commands that can be typically utilized in a Microsoft Windows environment. These include screen commands such as move cursor up, down, pan left, pan right, pan up, pan down, zoom in, zoom out, zoom 5×, zoom 10×, etc. Vocal commands may also include commands such as "select" "back" forward" or other application specific commands such as "bold" "underline", etc.

Figure 7B:
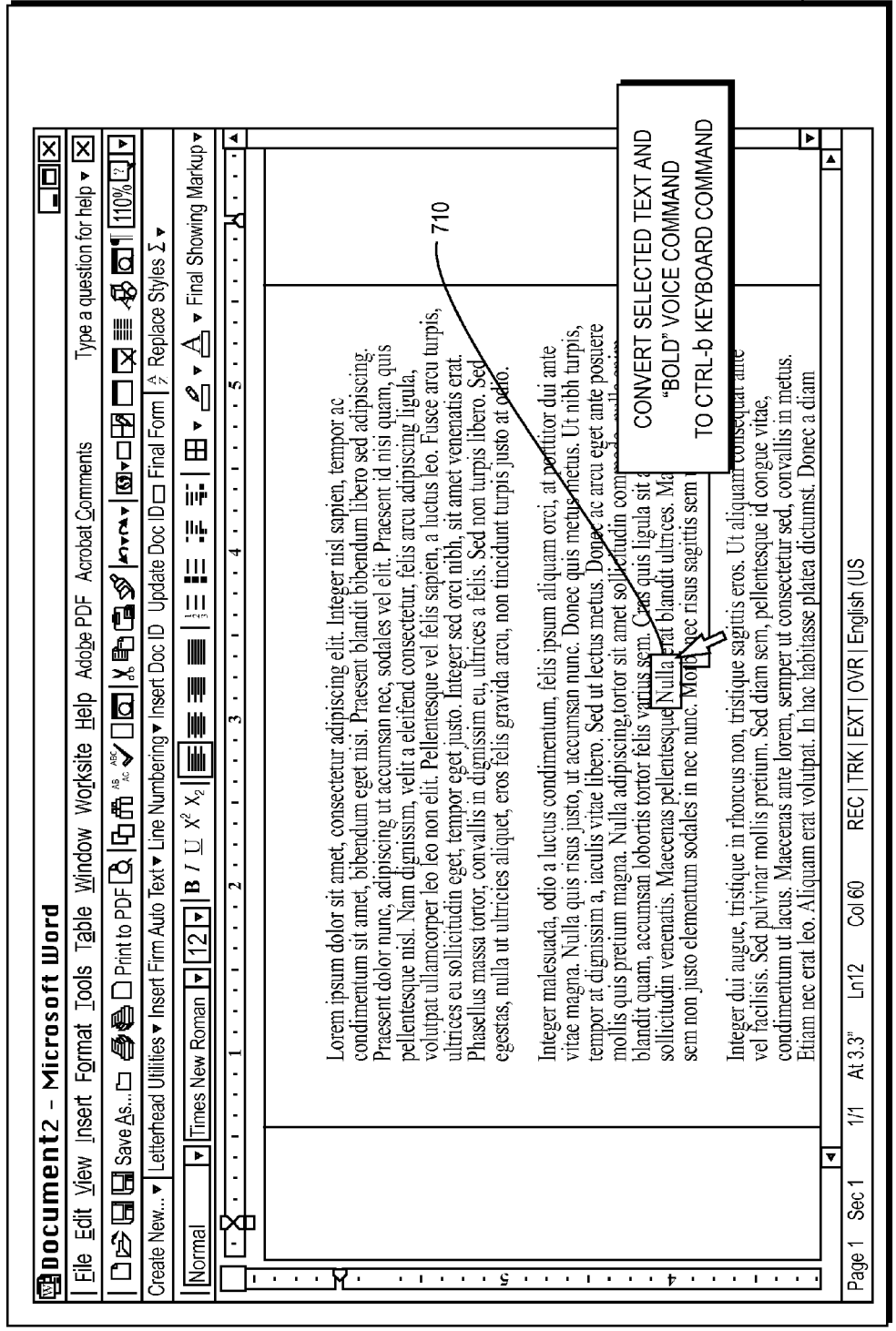
FIG. 7B illustrates how tracked head movements and a "BOLD" vocal command can be used to interact with Microsoft Word.

The remote control device may also include a software overlay for supporting applications such as Microsoft Word. As shown in FIG. 7B, the application overlay may use hand/head movement and vocal commands to select an area of text 710. Next, the vocal command "select bold" is converted to a Control-B command by the remote control device 100. This Control-B is then sent to the host 200 and ultimately Microsoft Word to cause the selected text 710 to be placed in the bold font.

Figure 8:
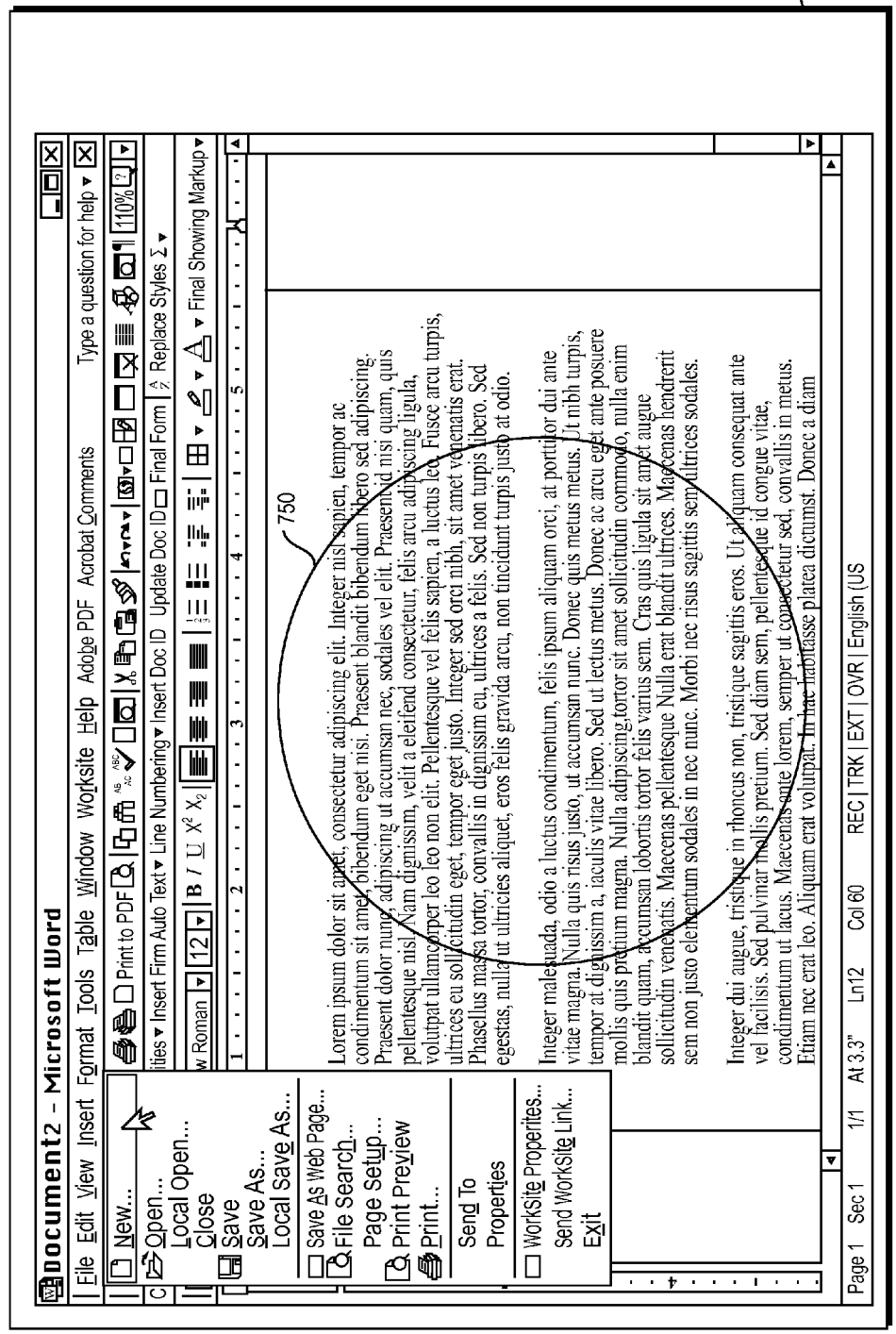
FIG. 8 shows how a person with loss of peripheral vision can utilize the remote control display device more effectively.

FIG. 8 illustrates another example using the remote control device 100 to assist people having loss of vision. A large portion of the population has vision loss requiring correction such as through the use of bifocal lenses. These people tend to be near sighted and/or have loss of peripheral vision such that only areas in the center of their view are truly in focus. They cannot typically easily use head mounted displays such as that shown in FIG. 1A. Due to this limited ability they cannot, for example, adjust their bifocals to clearly see all of the micro display, and the edges of the microdisplay 140 will appear out of focus. The apparatus described herein frees such users to select a field of view within a larger virtual display thus enabling them a much more pleasant experience.

As shown in FIG. 8, a main menu of application software typically runs across the top or bottom of a screen. However, these menu areas can often be out of focus for a person of limited vision trying to use a microdisplay 140.

Figure 9:
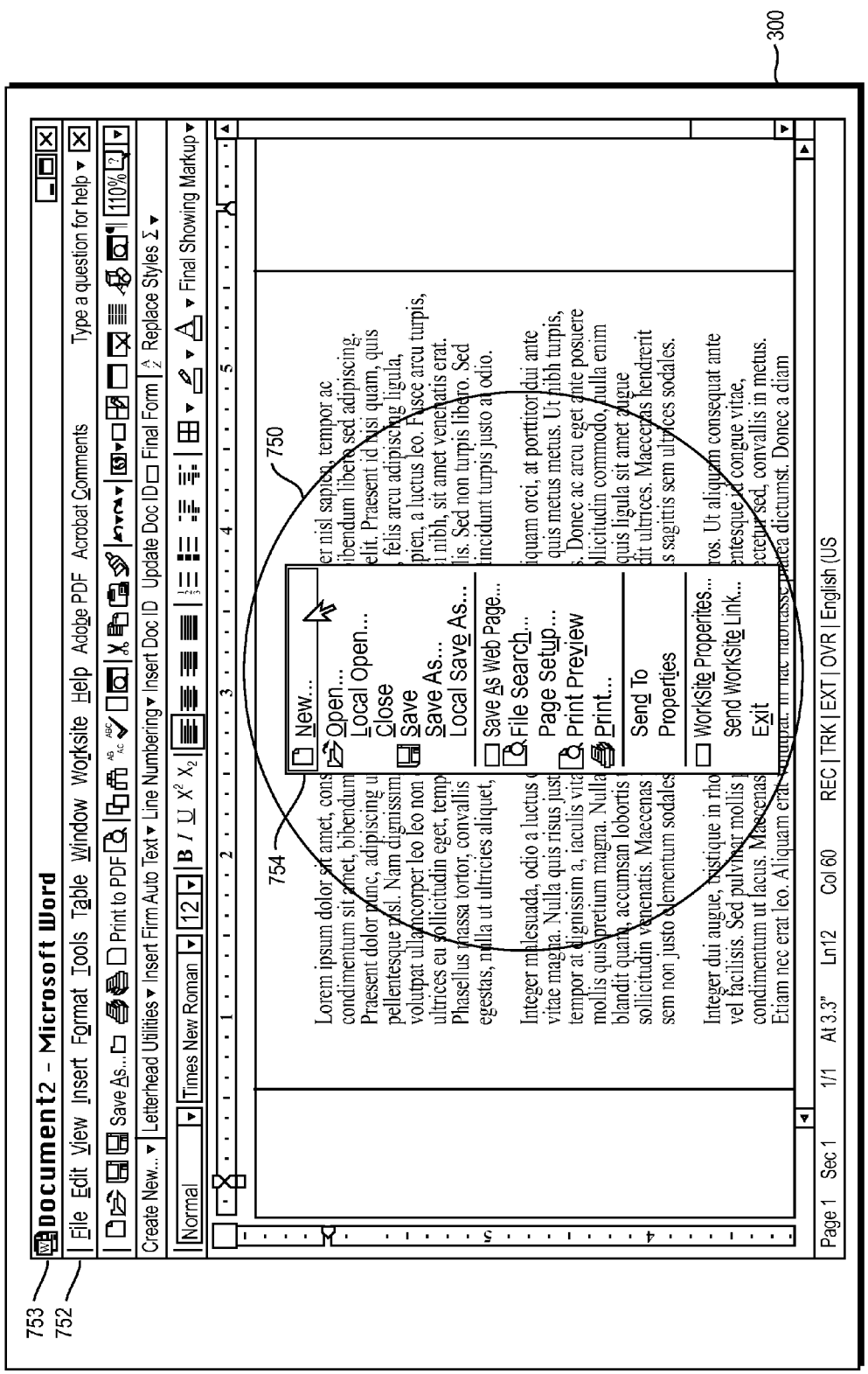
FIG. 9 is an example of how the center portion of the field of view may temporarily display a menu to assist such a person of limited vision.

Using the remote control display device 100, the main menu can instead be caused to appear in the center 250 of the field of view 300 via a vocal command as shown in FIG. 9. For example, a vocal command "call main menu" can force a main menu of commands 754 to appear as an overlay in the center 750 of the field of view 300, instead of adjacent to a menu bar 752 along the top 753 of the view 300. The user can then select commands within the menu such as via further verbal or hand/head movement commands. Upon selection of a command, the menu then disappears allowing a viewing of the underlying information once again.

As can now be understood, the user can utilize voice commands to either fix the field of view within the virtual area and allow hand/head movements to control the mouse position or the user can cause the cursor position to be fixed and allowing the field of view to be panned and zoomed around within the virtual area. The user can also control how much movement translates into a particular mouse or pan/zoom command, i.e., defining a scale for the movements within the context of the larger virtual display.

A unique aspect of using the remote device for the web browsing is to use vocal commands in connection with head movement commands to navigate through web pages.

As can now be understood, only a portion of the virtual display presented by the host computer need be fed back from the host 200 to the device 100. Thus, for example, only the amount of the display within the field of view needs to be returned.

Figure 10:
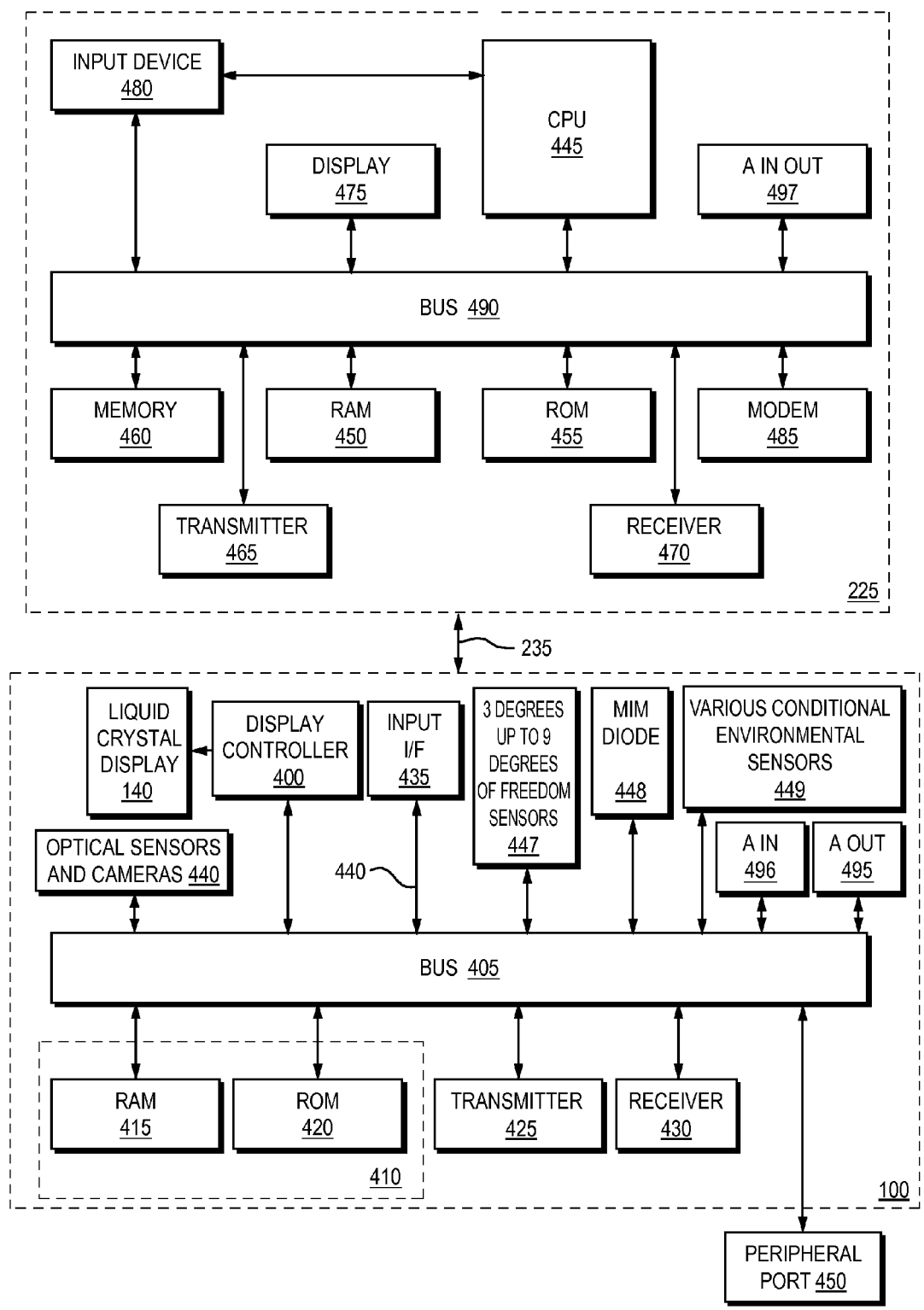
FIG. 10 is a simplified schematic block diagram illustrating internal components of an example embodiment monocular display device and a host computing device adapted to wirelessly transmit data over a bidirectional communication path.

FIG. 10 illustrates a simplified block diagram of a non-limiting example embodiment of the present wireless computing headset device 100 and an example host computing device 225. The device 100 includes a microdisplay element 140 connected to a display controller 400, which may be a digital signal processor made by Intel™, Texas Instruments™, or Advanced Micro-Devices (AMD)™. The controller 400 is connected to a bus 405, such as a Peripheral Component Interconnect (PCI) bus. In one embodiment, the microdisplay 140 alternatively may be connected to a video graphics chip (not shown) which is connected to the bus 405.

The host computing device 225 includes a central processing unit (CPU) 445, a memory having a RAM 450, a ROM 455, and also including a cached memory 460. The host computing device 225 further includes a transmitter 465 and receiver 470, which may be embodied as a combined transceiver. The host computing device 225 may also include a primary display 475 and an input device 480 which are both connected to a bus 490, such as a PCI bus. The bus 490 also may be connected to a wired broadband connection (not shown), wireless broadband connection 485, DSL line, cable modem, media player, music or video player, or any other suitable link to receive content.

The device 100 also includes memory 410, such as a random access memory (RAM) 415 and a read only memory (ROM) 420, which saves executable program instructions and communicates the program instructions to a display controller 400 through bus 405. Preferably, the device 100 further includes a transmitter 425 and a receiver 430, and/or a combined transceiver (not shown), both of which are connected to the bus 405 to form a wireless interface with the host computing device 225. The transmitter 425 and receiver 430 also are connected to the display controller 400 over the bus 405 and receive instructions for control thereof.

The device 100 also includes one or more input device interfaces 435 which may provide an interface to a wireless mouse, trackball, or keyboard, other similar user device that may be wirelessly connected to the PCI bus 405 by a wireless link 440, which is received by the receiver 430. Lateral and rotational head movements gestures around the X, Y and Z axes may be detected by 3 axis to 9 axis degrees of freedom orientation sensors 447, MIM diodes 448, various sensors 449, or other sensors/transducers. In some embodiments, sensors 447 can be Hall effect sensors and sensors 449 can be accelerometers. A camera 440 located on the device 100 may also provide input to the CPU 445 indicative of hand movements and gestures. The camera 440 may be a forward aiming video camera and/or an optical sensor capable of detecting hand movements and gestures. The input 435, camera 440, audio input 495 and sensors 447, 448, 449, etc. may control screen prompts on the device 100, the host computing device 225, or both, with the device 100 and the host computing device 225 in a master/slave networked relationship as desired elsewhere herein.

Any of the camera 440, audio input 496, 3 axis to 9 axis degrees of freedom orientation sensors 447, MIM diode 448, or various sensors 449, can be embedded or preferably removably attachable to device 100 via one or more peripheral ports 1020 previously mentioned in connection with FIG. 1B.

Display controller 400 outputs control signals to the display 140 to display images. This allows the device 100 to receive data stored on the cache memory 460 of the host computing device 225. When the host computer 225 is not in use, or switched off, the data viewed on the device 100 is from the cached memory 460, and not updated. This data may be slightly older and not refreshed through the communication links 300a through 300e, as compared with when the host computing device 225 is operational.

Alternatively, in a further example embodiment, the wireless computing headset device 100 may access the host computing device 225 across the wireless communication link 235 when the host computing device 225 is on, off, or in a reduced power state, such as a sleep or hibernate state. In this embodiment, the host computing device 225 operates at minimal power and periodically scans for an impromptu, spontaneous wake-up call or command from the monocular display device 100 to trigger a low-level command in the host computing device 225 to wake up the host computing device 225 and provide content or services to the monocular display device or alternatively a binocular display device. The host computing device 225 may be configured with a predetermined input/output (I/O) port to be monitored for a wake-up call or command that triggers the low-level command to wake up the host computing device 225. Ports include an Ethernet port or card, a WiFi™ port or card, a cellular port or card or a Bluetooth™ port or card suitable for wireless communication across the wireless communication link 235. This port is also known to the monocular display device 100 so that the wake up command may be sent properly to and received by the host computing device 225.

Any external hardwire or external wireless interface may be accessed to permit either a Microsoft Windows SideShow™ gadget or specialized software application to access data from the hibernating host computing device 225. The host computing device 225 listens for a specific address number, name or command directed specifically to the hibernating host computing device 225 to wake-up. Receipt of the command at the host computing device 225 triggers a low-level command to wake the host computing device 225. Once awake, the host computing device 225 furnishes any and all information and services requested by the wireless computing headset device 100.

When the transfer is finished, the wireless computing headset device 100 may transmit a command over the wireless communication link 235 to the host computing device 225. Upon receipt of that command, the Microsoft Windows SideShow™ gadget or specialized software application running on the host computing device 225 triggers a system-level command to cause the host computing device 225 to reenter hibernation, for example, until needed again later. Other reduced power states may be triggered, including sleep and off.

The wireless computing headset device 100 may provide many benefits to a user by taking advantage of the capabilities of Microsoft Windows 7 or later OS or specialized software application. Use of Microsoft Windows 7, later OS or specialized software application running on the host computing device enables a user to avoid having to carry a PC 225, for example, around when mobile or traveling. A user whose PC 225 was running the Microsoft Windows 7 or later OS or specialized software application may remotely and spontaneously contact their PC 225 from anywhere, thereby instantly receiving the host computing device 225 information content and services needed, and then return their PC 225 to a hibernation state.

Further, device 100 allows large facilities to reduce their computer and accessory power consumption by allowing users to not have to leave computers running when not attended while still providing their users immediate access to all or the PC information, computing services and their normal access to company computer resources at user demand. It also reduces general PC maintenance, repair and even damage during travel. Moreover, a reduction in running unattended PCs allows large facilities to reduce air-conditioning power requirements to cool un-attended PCs and allows unattended PCs, even many servers, to be placed in hibernation until the moment they are required.

The device 100 also allows PC users to no longer have to wait for their PCs to boot-up (e.g., 5-10 minutes per boot-up cycle is not unusual). Whether the PC is in near proximity to the user (e.g., <30 feet) and accessed from hibernation by a Bluetooth™ wireless command, WiFi™ command or over a greater distance by cellular wireless command or even over the Ethernet interface, the PC is hibernating and ready to spring into action when called upon by the user. For example, after a PC is booted in the morning of a work day or just prior to taking a trip, the PC may remain in a hibernating mode and not have to be booted again, until absolutely necessary or desired by the user.

Further, a PC user may use the Microsoft Windows 7 or later OS or specialized software application to provide remote access to storage, contents, applications and services of the host computing device, and may operate remotely without requiring user interaction with the host computing device through protocols, such as Remote Display Protocol (RDP) and Virtual Network Computing (VNC), and commercial services, such as GoToMyPC.

Figure 11:
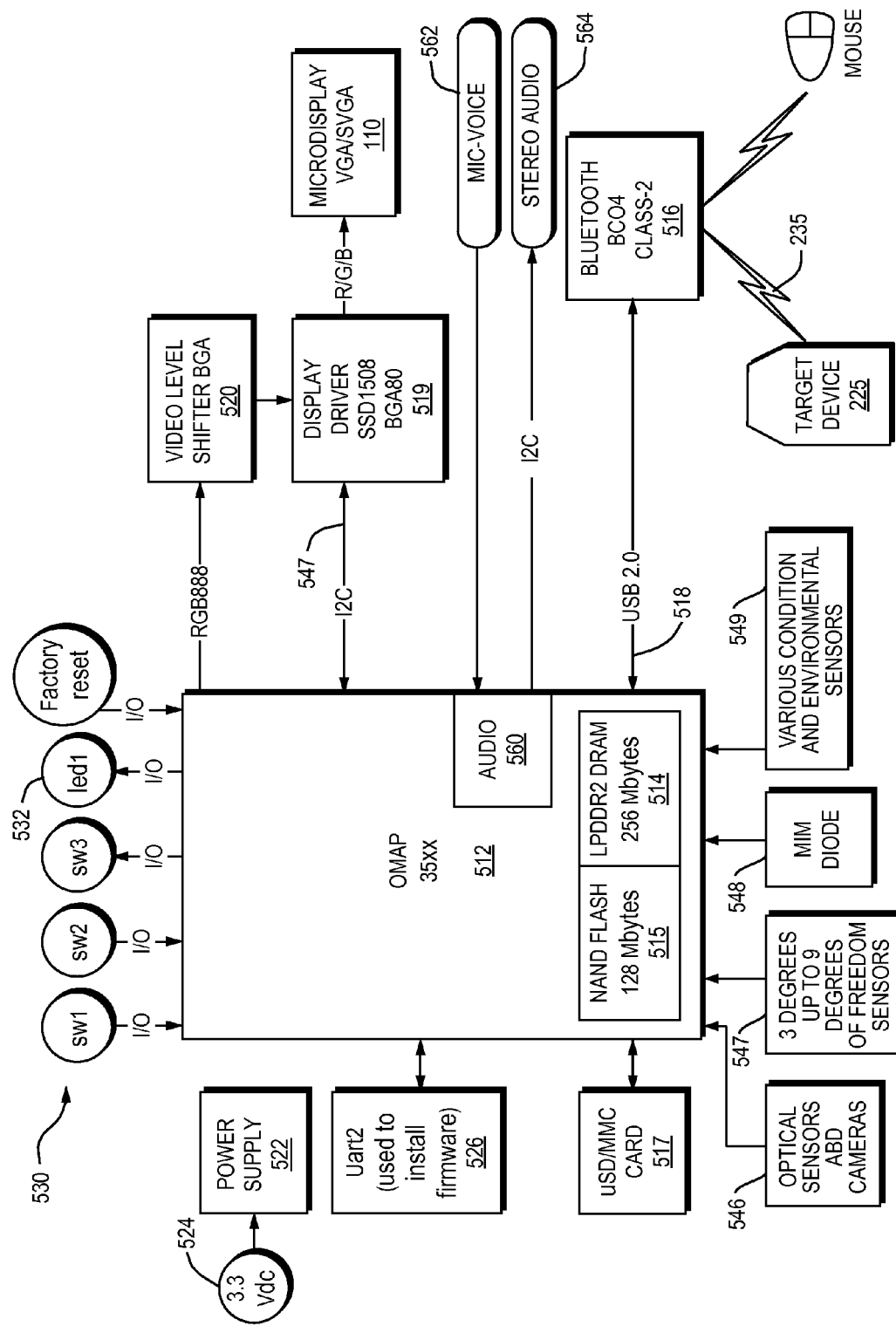
FIG. 11 is a detailed schematic block diagram illustrating internal components an example embodiment monocular display device to receive content over a Bluetooth™ connection.

FIG. 11 provides a more detailed view of the electronic components incorporated into the device 100, which is connected to host computing devices 225 to receive a digital video signal over a Bluetooth connection. These components are described in greater detail in a co-pending patent application U.S. application Ser. No. 12/348,627, filed on Jan. 5, 2009, entitled "Method And Apparatus For Transporting Video Signal Over Bluetooth Wireless Interface", which is incorporated herein by reference.

In the preferred embodiment, the wireless computing headset device 100 includes an single or multi-core Advanced Reduced instruction set computer (RISC) Machine (ARM)/Digital Signal Processor (DSP) 512 (which may be an Open Multimedia Application Platform (OMAP) 3500 or newer series processor, available from Texas Instruments of Dallas, Tex.), memory 514, Bluetooth interface 516 which may be provided by a Class 2 Bluetooth interface available from Cambridge Silicon Radio (CSR) of Cambridge, England), display driver 519 (which may, for example, be an SSD1508 display driver available from Kopin Corporation of Westborough, Mass.), video level shifter circuits 520, a power supply 522 supported by a battery 524, universal receiver transmitters (UART) 526 (such as may be used for debugging) and memory 515. A Secure Digital (SD), eXtreme Digital (xD), USB SD (uSD) memory 517 or other similar interfaces may be used to store application programs, kernel directives, or configuration data, and/or connect to devices such as a digital camera. A number of the input devices 530 mentioned previously may be associated with the device (e.g., switch 1/switch 2/switch 3 and reset inputs), camera 546, 3 axis up to 9 axis freedom of position sensors 547, which can be in some embodiments Hall effect sensors, MIM diodes 548, various sensors 549, which can be in some embodiments accelerometers, track pads and scroll wheels, and an LED output 532 (led 1). A VGA or better quality microdisplay element 140 and audio input and output device(s) 560, which may include one or more microphone inputs 562 and stereo outputs 564, are also provided.

The video signal may be sent over a wireless interface, such as a Bluetooth™ wireless communication link 235 established using Serial Port Profile (SPP) from the monocular display device 100 to the host computing device 225, as opposed to using any of the "advanced" Bluetooth modes, which provides greater throughput higher than the higher layer protocols imposed by such advanced modes that have been found not to be needed in this application. In the Bluetooth™ radio 516, a video signal received over the Bluetooth™ connection is sent over the USB connection 518 to the processor 512. One design consideration is to optimize data packet format, given known data buffer sizes. Internal to the Bluetooth™ radio 516 is a packet buffer default size of 1000 bytes. This may be modified to force streaming video signals to use only about a 990 byte buffer size. The processor 512 may expect the received video content to be encoded with the H.264 (Motion Picture Experts Group (MPEG)-4 part 10) formatting, using the so-called baseline profile or better.

In a preferred embodiment, the processor 512 may use a multi-tasking embedded operating system. The processor 512 operates on the received video signal as follows. An MPEG format container file (e.g., a .MP4 file) is made available. In one preferred embodiment, this may be a proprietary file format, although the specific details of the input .MP4 file format chosen are not important here, as long as the processor 512 is programmed to correctly process it. The processor 512 then opens a communication port to the host computing device 225 and receives the file over the USB interface 518 from the Bluetooth™ radio 516.

An MP4 decoder in the processor 512 strips the file into respective audio and video streams. More particularly, the processor 512 decodes the input file H.264 compressed digital video signal into a YCbCr baseband component video signal. The processor 512 may also divide the associated compressed audio (formatted as an Advanced Audio Coding (AAC) format signal) into baseband stereo audio.

The processor 512 may output video in any suitable format such as an 8 bit, International Telecommunication Union Radio Communication Sector (ITU-R) Recommendation BT. 656 or Society of Motion Picture and Television Engineers (SMPTE) 293M 16 bit YUV progressive scan signals with separate sync signals, to the display driver 519. The decompressed video signal is forwarded over an internal ARM bus of the processor 512. The ARM bus then sends the content directly to the display driver 519 via the SMPTE 293M interface. The Intelligent Interface Controller (I2C) interface 547 is used to configure the microdisplay element 140. The processor 512 also outputs the baseband audio to the audio output Compression/Decompression Module (CODEC) 560. It may take mono or stereo audio input and produce suitable stereo output signals.

Figure 12:
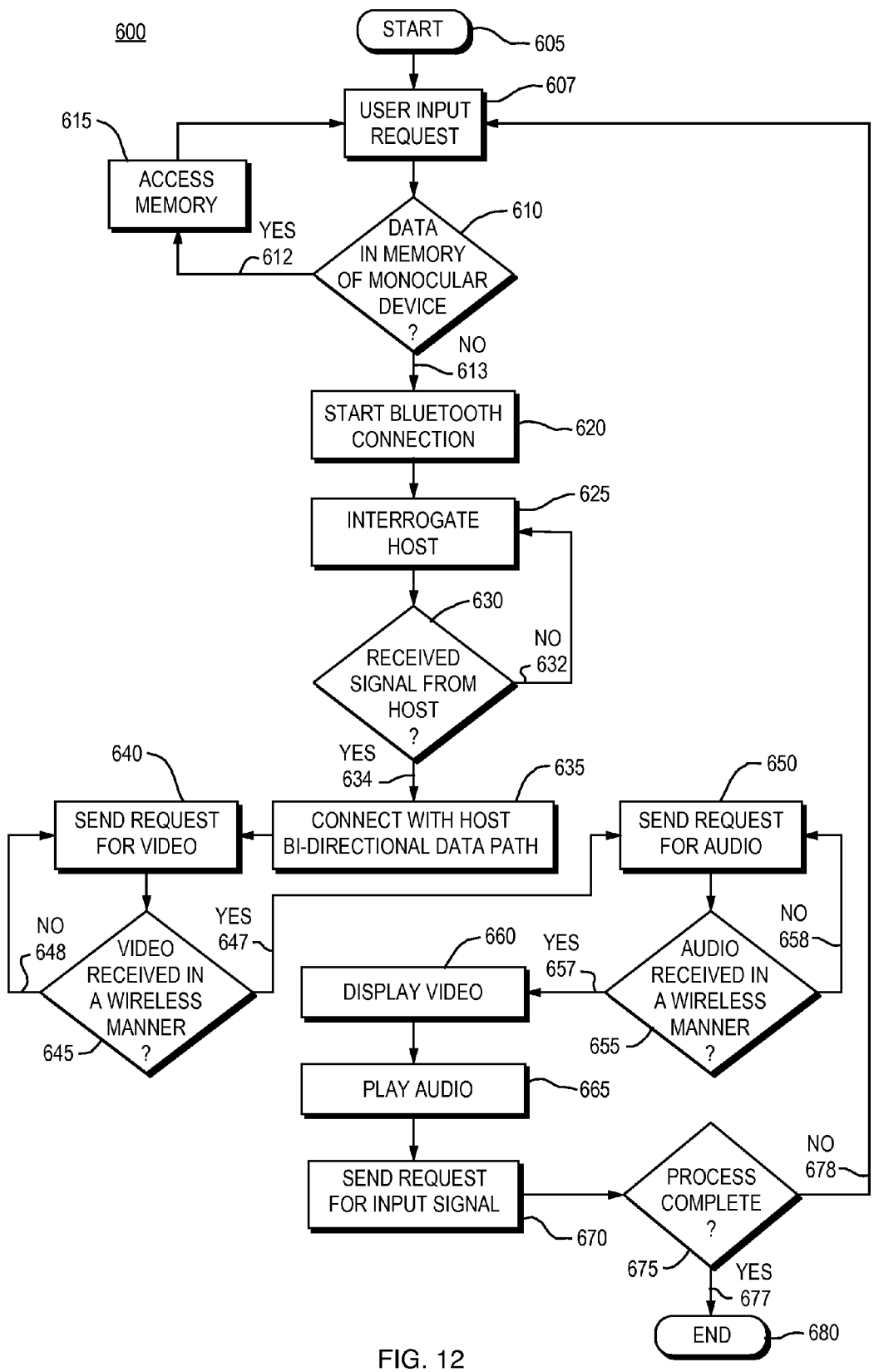
FIG. 12 is a flow diagram illustrating a method of operation of an example embodiment monocular display device.

FIG. 12 is a flow diagram of a method 600 of operation according to an embodiment of the device 100. In a first step, the method commences (step 605). Thereafter, the device 100 awaits (step 607) a user input request. This input may be any signal output from an input device, such as, for example, an output generated by user head movement of the monocular display device as detected by MIM diodes, 3 axis up to 9 axis degree of freedom sensors or accelerometers, or from the camera detecting a hand motion or gesture or from a wireless trackball, a wireless mouse, or a wireless key pad, or a button located on the housing of the monocular display device.

In one embodiment, using an operating system such as Microsoft Windows CE 6, Mobile™ or later operating system, and using a hand gesture input and vocal command, the user may "double click" an icon on the monocular display device screen (e.g., microdisplay element 140 of FIG. 1A) to indicate to open an electronic mail message, or to open an application. (Please refer to the above discussion of FIG. 3A through FIG. 8 for specific examples.) Thereafter, the method 600 attempts to receive data from a source of content, in response to the request, and the method determines (step 610) whether the content source is located in a memory on the monocular display device (e.g., memory 410 of FIG. 4), such as, for example, on a camera output, or whether, the source is located at another remote location, such as, on the host computing device (e.g., host computing device 225 of FIG. 2). If the data is indeed stored locally (step 612) and no wireless link is needed, then the local memory is accessed (step 615) and the data is configured to be retrieved and loaded for subsequent display on the display element. Once the method 600 accesses the local memory (step 615), the method 600 returns to wait for a new user input request (step 607).

However, if the data is located on a remote memory or in a memory not located on the monocular display device (step 613) then a Bluetooth™ connection, or other previously described wireless connection(s), is started (step 620) to obtain the data as requested (step 607). Other wireless communication formats may also be used, as previously discussed, and the present method 600 is for illustration purposes only.

The device's transmitter (e.g., transmitter 425 of FIG. 10) may be activated to interrogate the host computing device, and to send an initial configuration signal to the receiver (e.g., receiver 470 of FIG. 4) of the host computing device (step 625). The host determines whether the Bluetooth™ signal is sufficiently powered and was received from the monocular display device 100 (step 630). Once the signal is received, the host transmitter (e.g., transmitter 465 of FIG. 10) sends a confirmation signal to the wireless computing headset device receiver (e.g., receiver 430 of FIG. 10) using a second predetermined signal. If the signal was not received (step 632), then the wireless computing headset device continues to interrogate the host (step 625). A stronger or more directive signal is sent. If the signal is received correctly by the host computing device (step 634), then a bi-directional communication data path is formed across the wireless link (e.g., wireless link 150 of FIG. 1A) (step 635). Uplink and downlink signals may be communicated across the bidirectional connection data path to and from the devices (e.g., device 100 and host computing device 200 of FIG. 1A), the present method being merely illustrative as various diagnostic, utility applications and signals that may be sent along the wireless link in addition to the non-limiting method of FIG. 6.

Once the bi-directional communication data path is formed (step 635), multimedia data files may be communicated from the host computing device to the wireless computing headset device. In one non-limiting embodiment, the bandwidth of the communication path is sufficient in bits per second (bps) that, when operating Microsoft Windows 7 or later Operating System at the host computing device, the graphical output of the host display output screen (e.g., host display 475 of FIG. 10) is visible in real time at the microdisplay element (e.g., microdisplay element 140 of FIG. 10), such that if both displays were held side by side, a cursor movement occurs on both screens substantially simultaneously to enable remote operation of the host computing system at the wireless computing headset device.

The display controller (e.g., controller 400 of FIG. 10) sends a request for a video signal from the computing device (step 640). The request is communicated to the bus 405, and to the transmitter and then sent across the link. Thereafter, the wireless computing headset device determines whether the video signal was received from the host computing system in a wireless manner (step 645). If the signal was received wirelessly (step 647), then the wireless computing headset device requests audio (step 650). If the signal was not received in a wireless manner (step 648), then the wireless computing headset device returns to send another request (step 640).

The display controller sends a request for an audio signal from the host computing device (step 650). The audio and the video signal may be sent as one continuous signal and the present disclosure is not limited by any such two signal embodiment. The request is communicated to the bus (e.g., bus 405 of FIG. 10), to the transmitter, and then sent across the link. The wireless computing headset device then determines whether the audio signal was received from the host computing system in a wireless manner (step 655). If the audio signal was wirelessly received (step 647), then the wireless computing headset device displays video (step 660). If the audio data or signal was not received wirelessly (step 648), then the wireless computing headset device returns to send another request (step 650).

Program instructions cause the wireless computing headset device to display video on the microdisplay element by the display controller (step 660) and play audio using the audio device (e.g., audio output device 495 of FIG. 10) (step 665). Thereafter, a request for a further input signal is sent (step 670). It is then determined whether the process is complete (step 675). If the process is complete (step 677), then the method ends (step 680). If the process is not complete (step 678), a further user input request is awaited (step 607). Various control configurations are possible and within the scope of the present disclosure, and the present configuration is for illustration purposes only, and multiple other steps for encryption, and to decipher host computing or other external computing device formats may be carried out.

Head movements such as lateral movements along and rotational gestures around the X, Y and Z axes may be detected by 3 axis up to 9 axis degree of freedom sensors 447, MIM diodes 448, sensors 449 or other sensors/transducers built in and/or attached to peripheral port 1020 (FIG. 1B). The device 100 also may also use an external input device 435 which may be a wireless mouse, trackball, or keyboard, other similar wireless input device that may be wirelessly connected to the PCI bus 405 by a wireless link 440, which is received by the receiver 430. Alternatively, the input device 435 may be connected in a wired manner (not shown) to the bus 405 to provide an input signal to the controller 400. The input device 435 may control screen prompts on wireless computing headset device 100, the host computing device 225, or both, with the wireless computing headset device 100 and the host computing device 225 in a master/slave networked relationship.

Of importance to the present disclosure is that the device 100 also includes one or more peripheral ports 1020 or "hot shoes" that allows various sensor peripherals to be removably attached and detached.

Figure 13:
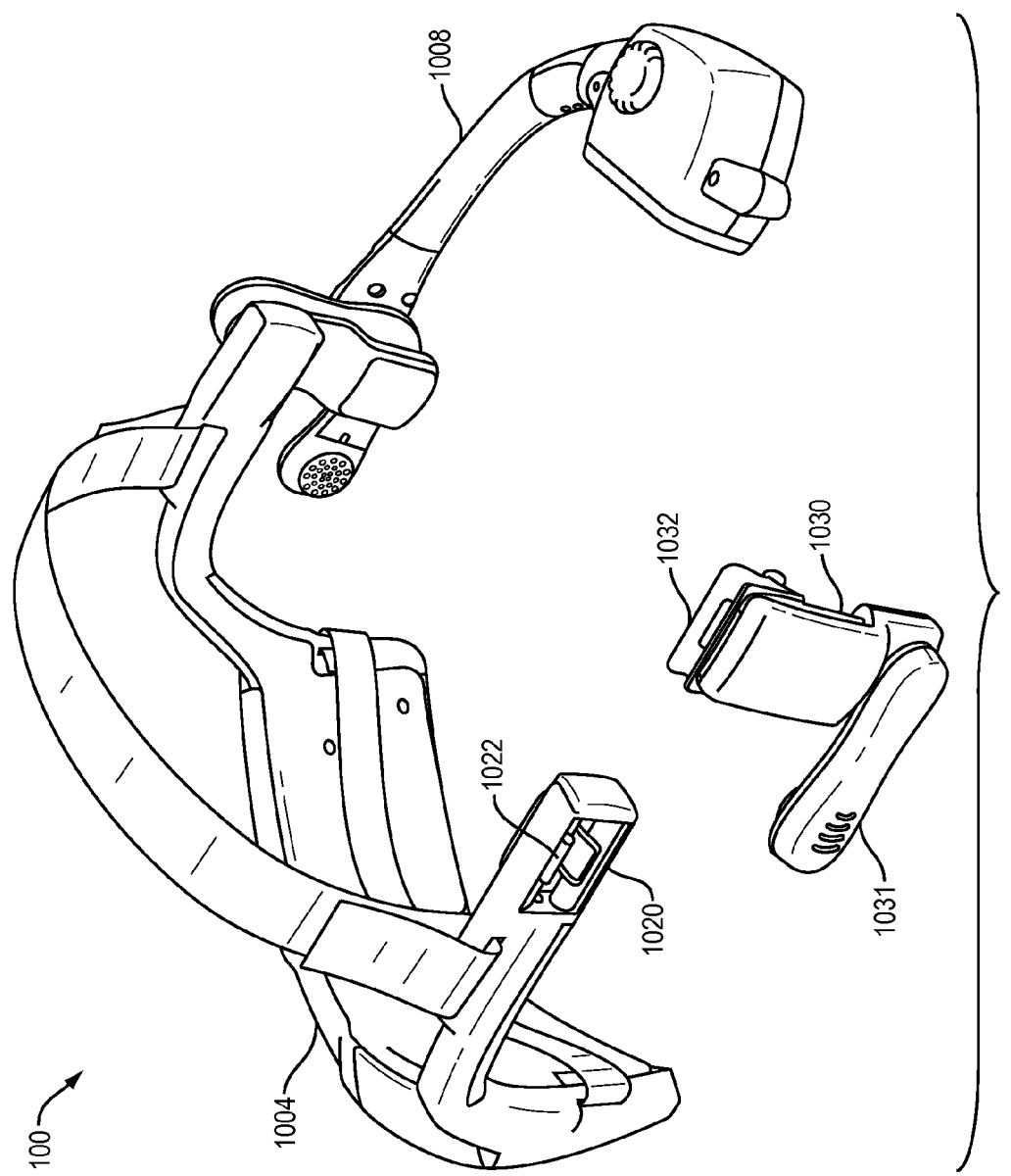
FIG. 13 is another view of the wireless computing headset showing a peripheral port and speaker.

FIG. 13 shows one example of the device 100 with an auxiliary speaker 1031. With this selected accessory, the user can now enjoy stereo audio.

Figure 14:
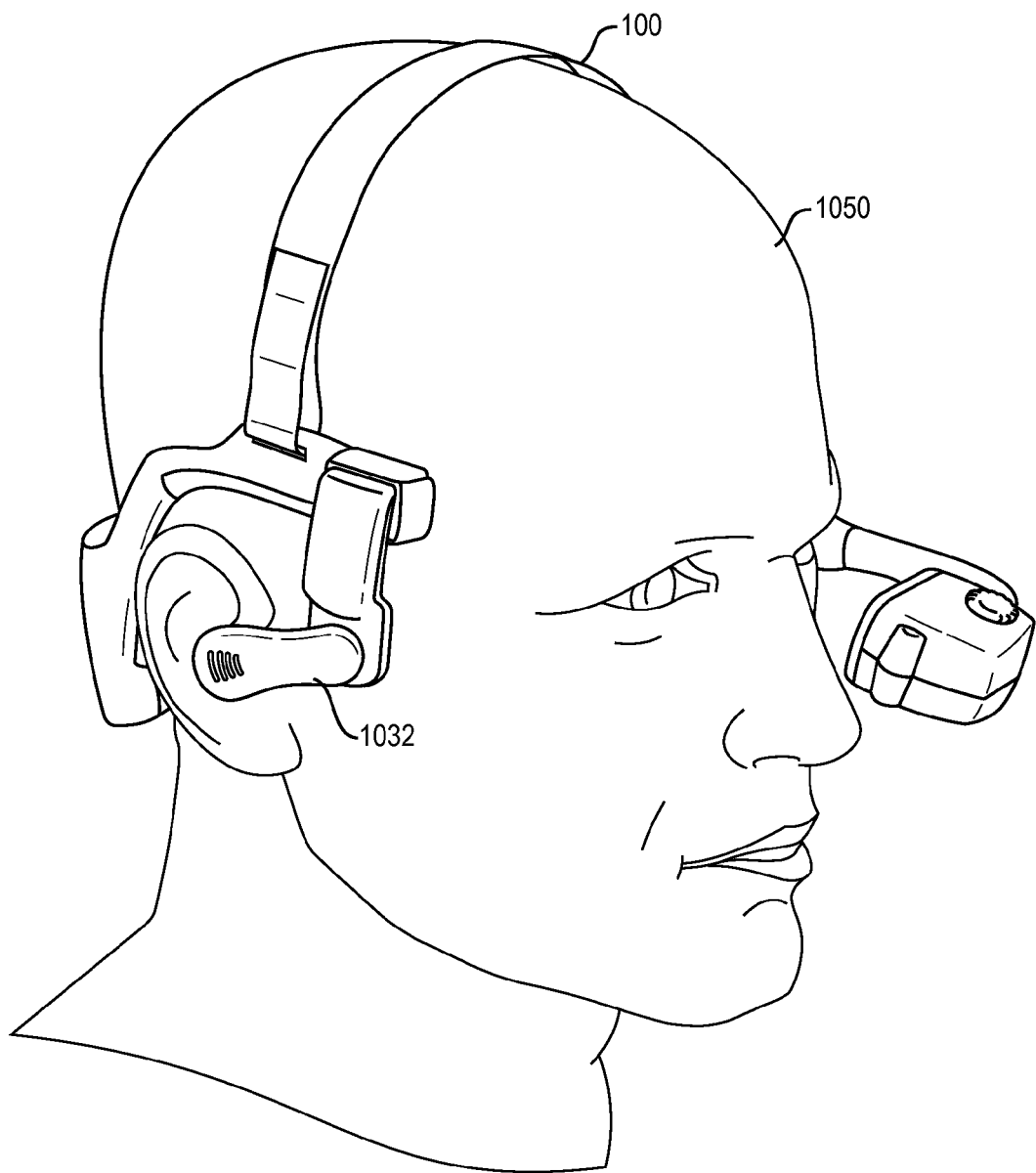
FIG. 14 is a view showing a speaker peripheral installed in the port.

FIG. 14 is a perspective view showing the device 100 as worn on a user's head 1050. Here, the second peripheral speaker 1032 is again shown.

Figure 15:
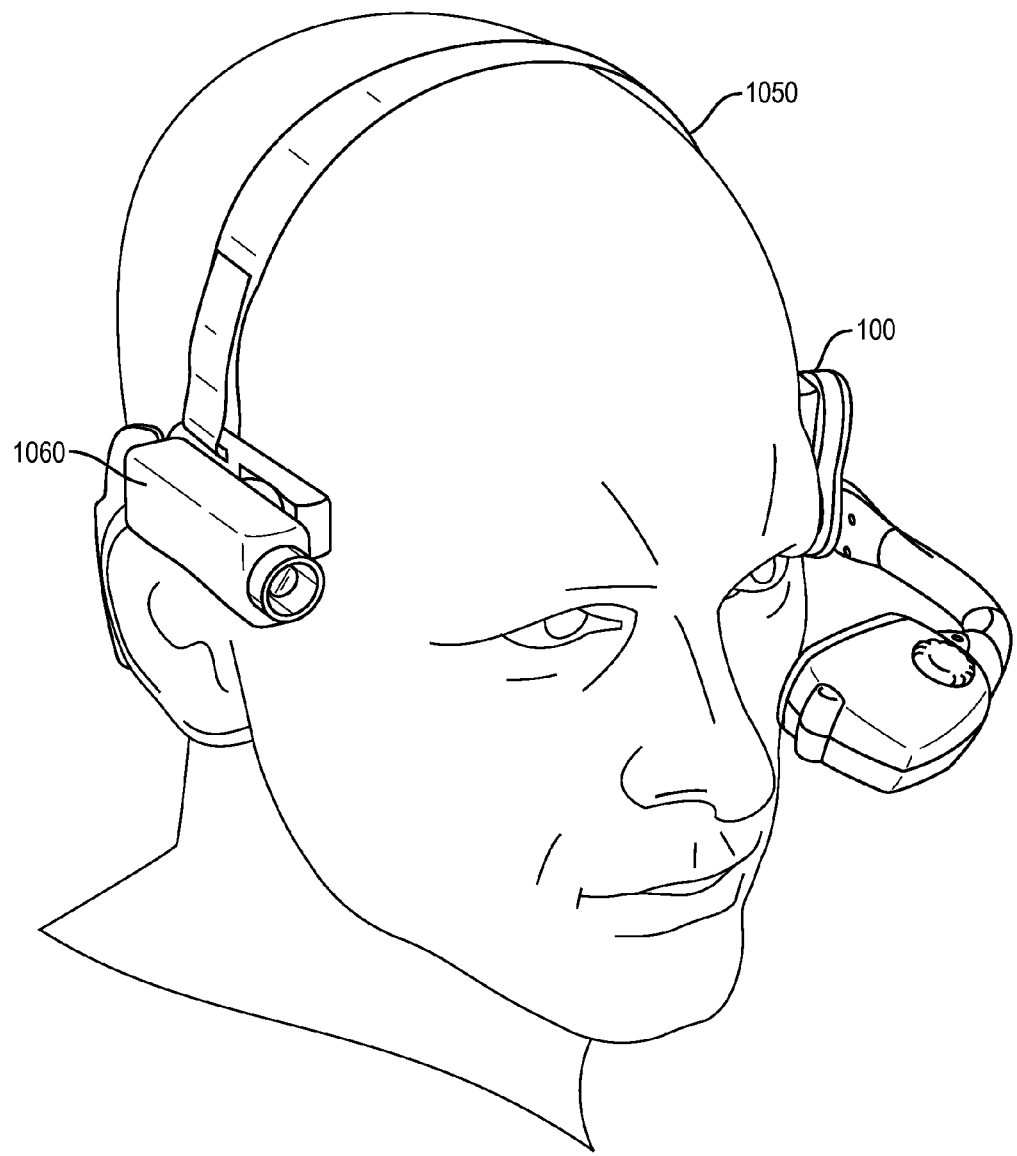
FIG. 15 shows a camera peripheral.

FIG. 15 illustrates another type of accessory that may be placed in port 1020. This accessory is a self-contained camera (or older motion sensor) assembly 1060. The camera 1060 can include both audio and video sensing and recording capabilities. The camera 1060, as shown in FIG. 6, can be packaged similar to a "bullet cam". It can be connected to the remaining components in device 100 via built in wiring in the back section 1004 (as in the case of the speaker previously described) or can be wirelessly connected via a Bluetooth™ or WiFi™ connection.

User commands, which may be via the previously mentioned head movement tracking and/or vocal commands, can also be provided by the user 1050 to manipulate the settings of camera 1060. For example, a user vocal command, such as "zoom" or "pan", can be recognized by the controller 400 and cause the camera 1060 to zoom in or telephoto out.

It should be understood that the camera 1060 may not necessarily be a video camera, but may also detect infrared, ultraviolet, or other wavelengths. The camera 1060 can also include a user adjustable auxiliary light source. With the light source, the camera 1060 can also be used as a flashlight as desired without the camera portion.

The camera 1060 may also have a built in image stabilization system and/or a movement tracking solution by leveraging the 3 axis up to 9 axis degree of freedom position sensors so that software in the device 100 or attached peripheral device can correct an incoming video feed for small, vibrations, head movements or small camera movements, especially when the camera image is magnified, via the movements detected. In this configuration, the device 100 can also operate at a higher frame rate than what is actually being captured by camera 1060 alone. Numerous applications exist for such a camera 1060 peripheral. For example, it can be placed on the head of an elderly person and device 100 can recognize and correct vibrations in their head movements, due to natural human stability tremors which typically increase with age. This can help with accuracy of cursor movement when the device 100 is used as a remote control for the host 200. The device 100 can also be used when riding in a moving vehicle or conveyance over a rough surface, in rough weather or in a harsh environment, such an unpaved road, to correct the view on the display 1010 for vibration, and again provide better control of cursor movement.

Figure 16:
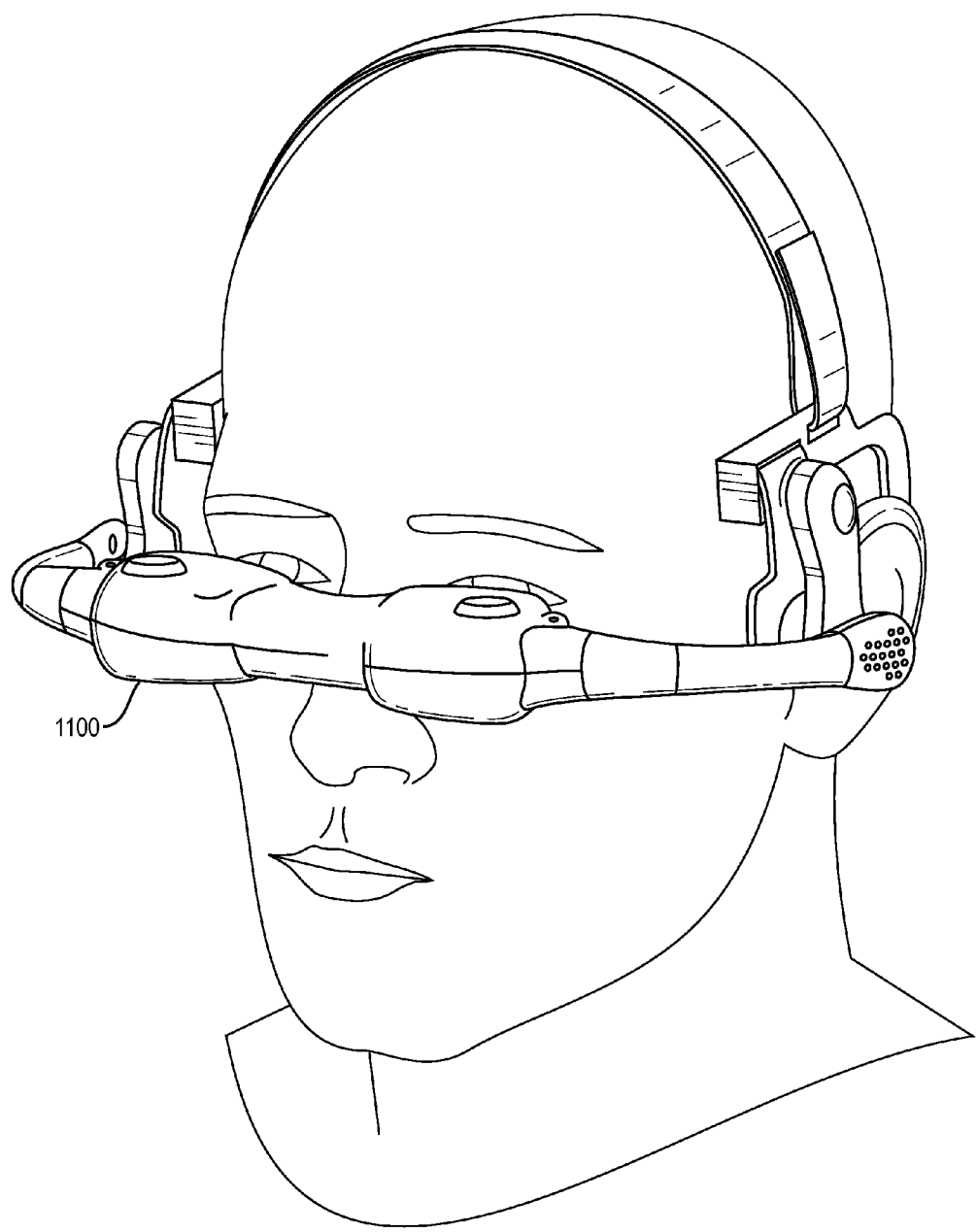
FIG. 16 shows a second display peripheral.

FIG. 16 illustrates an embodiment where the peripheral is a second display unit 1100. The device 100 then becomes a binocular display and provides the various advantages thereof, for example, providing virtual binocular 3D imagery.

Figure 17:
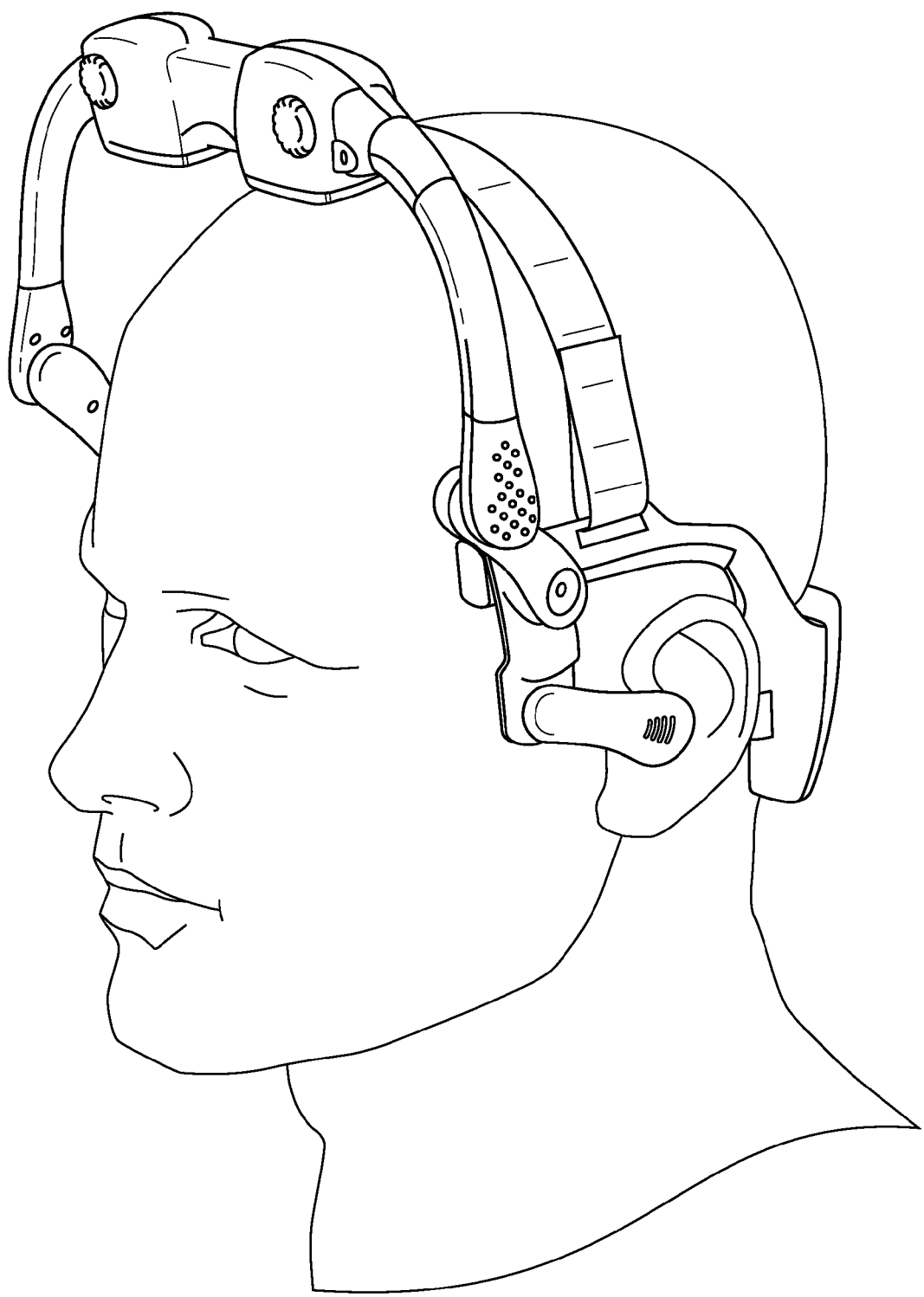
FIG. 17 shows cantilevered arms.

FIG. 17 illustrates one embodiment of a binocular assembly where a pair of cantilevered arms can be pivoted in an upward position to allow the user to move the display and the peripheral device out of their field of view.

Figure 18:
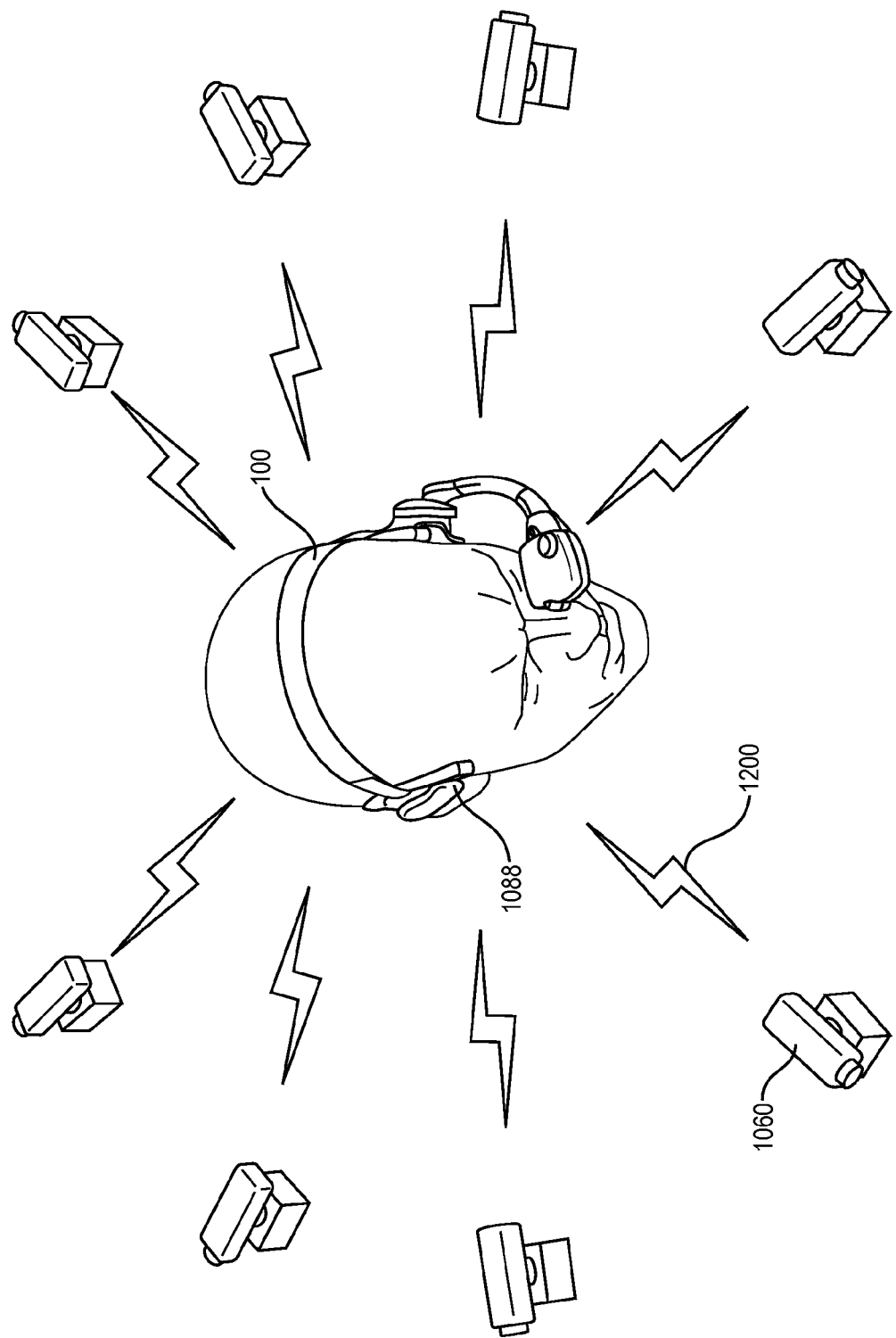
FIG. 18 illustrates control over multiple sensor peripherals such as multiple cameras.

FIG. 18 illustrates another use of peripheral port 1020 to control multiple wireless peripherals connected to device 100. These peripherals may be cameras 1060 and/or audio sensor systems connected to an interface 1088 inserted into one or more ports 1020. A device 100 making use of multiple wireless cameras 1060 can, instead of each being directly wired via the port 1020, be connected via multiple wireless connections 1200. Having central control over multiple wireless cameras can provide "rings" of visual and/or infrared detection. This allows the user, for example, to walk into a dark room, and place a number of the wireless infrared cameras to conduct surveillance in the room. In another example, the user 100 can place a single camera 1060 on one side of a machine and walk around the machine to observe an adjustment wheel.

Multiple wireless devices 1060 can also have microphones to provide for ambient noise cancellation and thus improved vocal recognition. For example, a user can speak into the microphone on device 100 in a normal tone and the actual voice data that enters the host 200 can have ambient noise cancelled, using further inputs from the peripherals 1060. The multiple microphones thus provide noise cancellation functionality.

The user may also place a remote camera 1060 in a location and program device 100 it so that it only turns on and reports to host 200 when a remote wireless camera 1060 detects vibration, ambient audio, ambient radio signals, changes in ambient light, changes in image areas scanned, information detected by various sensors, (for example, such as a needle on a gage in a machine). The system 100 or host 200 can then be programmed to notify the user only when a change is detected and that a recording is now taking place.

In another application, multiple wireless cameras 1060 can be spread about in different remote locations. The cameras can initially shut down with only the audio microphones activated. When specified audio is deteched, the cameras can automatically switch-on and make wireless streaming video available as desired. In arrangement at infrared wavelengths, the cameras can be used to look for heat sources such as other people.

Removable peripherals and cameras 1060 can also have a built in laser range finder device(s). The range finder(s) can allow the user to estimate distances to objects, calculate area measurements at a distance, such as at a construction site, or on a golf course, etc. In other modes the laser range sensor can be used to detect laser beams reflected back, for example, from a pane of glass, to pick up vibrations, detect and reproduce audible information from other objects at a distance.

In yet another use, the peripheral 1060 can include an LED or laser emitter (not shown). The LED or laser emitter can be used to temporarily scare, blind or dazzle other people in the vicinity of the user by vocal or gesture command. The laser can be programmed for a broad or narrow area and pulse repetition rate, and/or focus beam capability, or to emit at visible or non-visible frequencies. The device then becomes a valuable addition for police and security personnel.

In still other embodiments, the peripheral connected to port 1020 may be a wireless Bluetooth pen interface (not shown), such as the DotPenPro™ provided by Candle Dragon. Such a wireless pen can provide inputs to the device 100 that provide spatial and rotational orientation information. It may also allow the user to make notations and comments to digital files, documents, images, maps, schematics, plants, and stored in the memory of the device 100 or on host 200. The wireless pen can measure and apply user pressure applied to the pen, to adjust, for example, darkness or grayscale, or to set a virtual line or alphanumeric text that is virtually captured by the use of the wireless pen. The wireless pen can also control color pallets, various CAD image textures, weight of lines, color shading or grey scale which can also be individually selected by vocal commands while this pen is in use. The wireless pen can also be used as a mouse to highlight fields in menus on both the device 100 and host 200 and/or the wireless pen can input commands. The wireless pen can thus create alphanumeric text, drawn shapes, or CAD renderings, as well as modify and/or create or store other digital information in the device 100 and/or (via remote control) of the host 200. The handwritten alphanumeric text generated by the wireless pen can be converted to typewritten text of any size, spacing, or font and can interface to a word processor or graphical illustration software running on the device 100 or remote control host 200.

While this invention has been particularly shown and described with references to example embodiments thereof, it will be understood by those skilled in the art that various changes in form and details may be made therein without departing from the scope of the invention encompassed by the appended claims.

What is claimed is:

1. A headset computer (HSC) comprising:
   a microdisplay operatively attached to the HSC for displaying visual information received from a local HSC processor;
   a motion detector for detecting a physical movement of a body part of a user and providing a user motion input to the local HSC processor;
   one or more peripheral ports located on the HSC, wherein each of the one or more peripheral ports includes a mechanical and electrical accessory mount to operatively couple to and physically support one or more peripheral devices that provide one or more peripheral input signals indicating a peripheral sensor input or that respond to a user command, the one or more peripheral devices removably attached to the peripheral port;
   the local HSC processor located in the HSC and further comprising:
      one or more receivers, for receiving the motion and the peripheral inputs;
      one or more transmitters, for transmitting one or more user commands to control the one or more peripheral devices;

a translator, for translating user motion and/or peripheral sensor input from the one or more peripheral ports into the one or more user commands, the user command controlling the peripheral device or being executable by a host processor;

a communication interface, for forwarding the user command to a host processor, and for receiving a reply from the host processor;

a display controller, for forwarding information to be displayed on the one or more microdisplays in response to the reply, including at least an audible and/or visual confirmation of the local processor having processed the user commands and wherein at least one of the one or more peripheral devices is a second microdisplay for displaying information received from the local HSC processor in concert with the operatively attached microdisplay.

2. The apparatus of claim 1 wherein the one or more peripheral devices comprise:

one or more microphones, for receiving audio signals from the user, and wherein the local HSC processor further comprises:

a speech recognizer, for processing the audio signals to produce vocal commands; and wherein the translator further translates the vocal commands into the user commands.

3. The apparatus of claim 1 wherein the motion detector provides two or more motion inputs indicative of motion along two or more axes.

4. The apparatus of claim 1 wherein the motion detector is a camera for detecting hand and/or body gesture movements of the user.

5. The apparatus of claim 1 wherein the motion detector is a head movement tracking device for detecting 3 axis up to 9 axis degrees of freedom head movements of the user.

6. The apparatus of claim 1 wherein the communication interface is one or more wireless links between the HSC and the host processor.

7. The apparatus of claim 1 wherein the user commands are processed by the local processor to control an aspect of the presentation of visual information displayed on the microdisplay.

8. The apparatus of claim 7 wherein the user commands control a field of view.

9. The apparatus of claim 7 wherein the user commands control a zoom, pan, or scale factors.

10. The apparatus of claim 7 wherein the user command selects a hyperlink item in a web page display.

11. The apparatus of claim 1 further comprising a wireless interface to two or more remote cameras or one or more other peripheral devices.

12. The apparatus of claim 1 wherein the reply results in a cursor movement.

13. A method for operating a HSC comprising:

displaying visual information received from a local HSC processor on a microdisplay, the microdisplay operatively attached to the HSC;

detecting a physical movement of a body part of a user to provide a motion input using a motion detector;

using one or more peripheral ports as a mechanical and an electrical accessory mount for operatively coupling to and for supporting one or more peripheral devices for detecting a sensor input, the one or more peripheral devices removably attached to the peripheral port;

at the local HSC processor, the method further comprising:

translating the sensor and/or motion input into one or more user commands, the one or more user commands controlling the one or more peripheral devices or being executable by a host processor;

communicating the one or more user commands to the host processor and receiving a reply from the host processor in response to the user command;

controlling at least one aspect of the HSC, peripheral devices, host processor or visual information presented on the microdisplay based on the one or more user commands, including presenting at least an audible and/or visual confirmation of the local HSC processor having processes the one or more user commands wherein at least one of the one or more peripheral devices is a second microdisplay for displaying information received from the local HSC processor in concert with the operatively attached microdisplay.

14. The method of claim 13 wherein the aspect of the visual information is a field of view.

15. The method of claim 13 wherein the aspect of the visual information is a zoom, pan, scale factor and or 3D effect.

16. The method of claim 13 additionally comprising:

forwarding the user commands to a host processor using a wireless communications interface.

17. The method of claim 13 wherein the motion input is indicative of motion of the user in two or more axes.

18. The method of claim 13 wherein the motion input is provided by a camera for detecting hand movement or body gesture of the user.

19. The method of claim 13 wherein the user input is derived from head movement and positioning peripheral devices for detecting and tracking as little as 3 axis degrees of freedom or up to 9 axis degrees of freedom.

* * * * *

UNITED STATES PATENT AND TRADEMARK OFFICE
CERTIFICATE OF CORRECTION

PATENT NO. : 8,855,719 B2  
APPLICATION NO. : 13/018999  
DATED : October 7, 2014  
INVENTOR(S) : Jeffrey J. Jacobsen et al.

Page 1 of 1

It is certified that error appears in the above-identified patent and that said Letters Patent is hereby corrected as shown below:

On the Title Page

Under Related U.S. Application Data, insert:
--(63)    Continuation-in-part of Application No. 12/774,179, filed on May 5, 2010.--

Under Related U.S. Application Data, at the end of item (60), insert:
--Provisional Application No. 61/176,662, filed on May 8, 2009. Provisional Application No. 61/237,884, filed on Aug. 28, 2009.--

In the Specification

At column 1, line 11, insert:
--, and is a continuation-in-part of,-- after "priority to" and before "U.S. application Ser. No. 12/774,179"

Signed and Sealed this
Twenty-seventh Day of January, 2015

Michelle K. Lee
*Deputy Director of the United States Patent and Trademark Office*